(12) United States Patent
Crotty et al.

(10) Patent No.: US 10,100,474 B2
(45) Date of Patent: Oct. 16, 2018

(54) MODULAR BARRIER

(71) Applicant: SAFE TRAFFIC ACCESS CONTROL SYSTEMS, LLC, Jacksonville, FL (US)

(72) Inventors: Joseph T. Crotty, Jacksonville, FL (US); Grace M. Crotty, Jacksonville, FL (US); John J. Mahoney, Orange Park, FL (US); Laura L. Mahoney, Orange Park, FL (US)

(73) Assignee: SAFE TRAFFIC & ACCESS CONTROL SYSTEMS LLC, Jacksonville, FL (US)

( * ) Notice: Subject to any disclaimer, the term of this patent is extended or adjusted under 35 U.S.C. 154(b) by 330 days.

(21) Appl. No.: 15/144,778

(22) Filed: May 2, 2016

(65) Prior Publication Data
US 2017/0314218 A1    Nov. 2, 2017

(51) Int. Cl.
    *E01F 13/02*    (2006.01)
    *E04H 17/20*    (2006.01)
    *G02B 5/12*    (2006.01)

(52) U.S. Cl.
    CPC .......... *E01F 13/022* (2013.01); *E01F 13/028* (2013.01); *E04H 17/20* (2013.01); *G02B 5/12* (2013.01)

(58) Field of Classification Search
    CPC ...... E04H 2017/1447; E04H 2017/146; E04H 2017/1465; E04H 2017/1482; E04H 17/18; E04H 17/20; E04H 17/22; E01F 13/02; E01F 13/022; E01F 13/04
    USPC ....................................... 256/65.02
    See application file for complete search history.

(56) References Cited

U.S. PATENT DOCUMENTS

| 4,787,602 | A  * | 11/1988 | Pidgeon  | E01F 13/02 |
|           |      |         |          | 114/108    |
| 6,679,481 | B2 * | 1/2004  | McNalley | E04H 17/1413 |
|           |      |         |          | 256/65.01  |
| 2015/0014620 | A1 * | 1/2015 | Holmes | A01K 3/00 |
|              |      |        |        | 256/65.02 |
| 2016/0097215 | A1 * | 4/2016 | Molina | E04H 17/1443 |
|              |      |        |        | 256/65.12 |

FOREIGN PATENT DOCUMENTS

EP        0455094 A2 *  11/1991  ............... E01F 13/02

* cited by examiner

*Primary Examiner* — Jonathan P Masinick
(74) *Attorney, Agent, or Firm* — Mark Young, P.A.

(57) ABSTRACT

A kit contains mast modules that may be erected and connected in a variety of configurations to provide a barrier to accomplish any one or more of the following: guide traffic, protect and rope off an accident or crime scene, warn pedestrians and motorists of dangerous conditions, and shelter an area and/or first responders from sun and precipitation. Masts, coupling sleeves, coupling slots, slits and bases are interconnected to form a barrier.

20 Claims, 27 Drawing Sheets

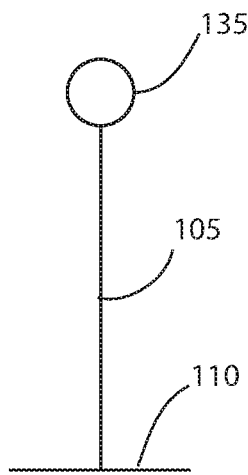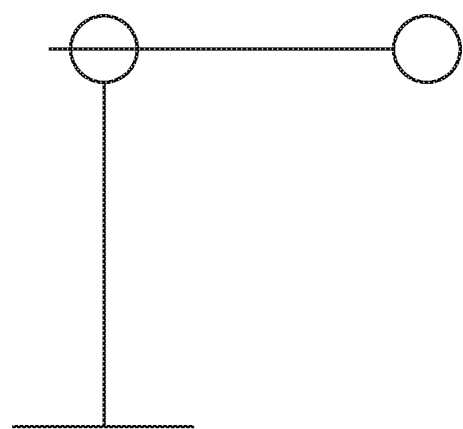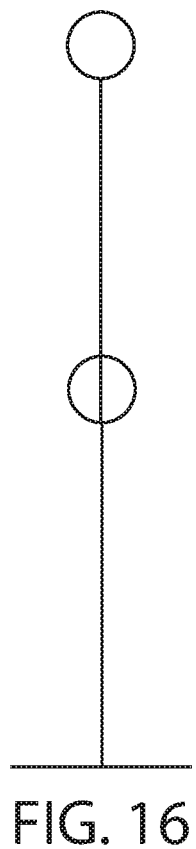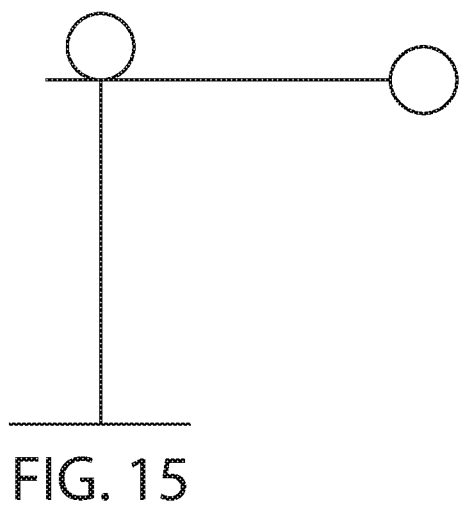
FIG. 13    FIG. 14
FIG. 15    FIG. 16

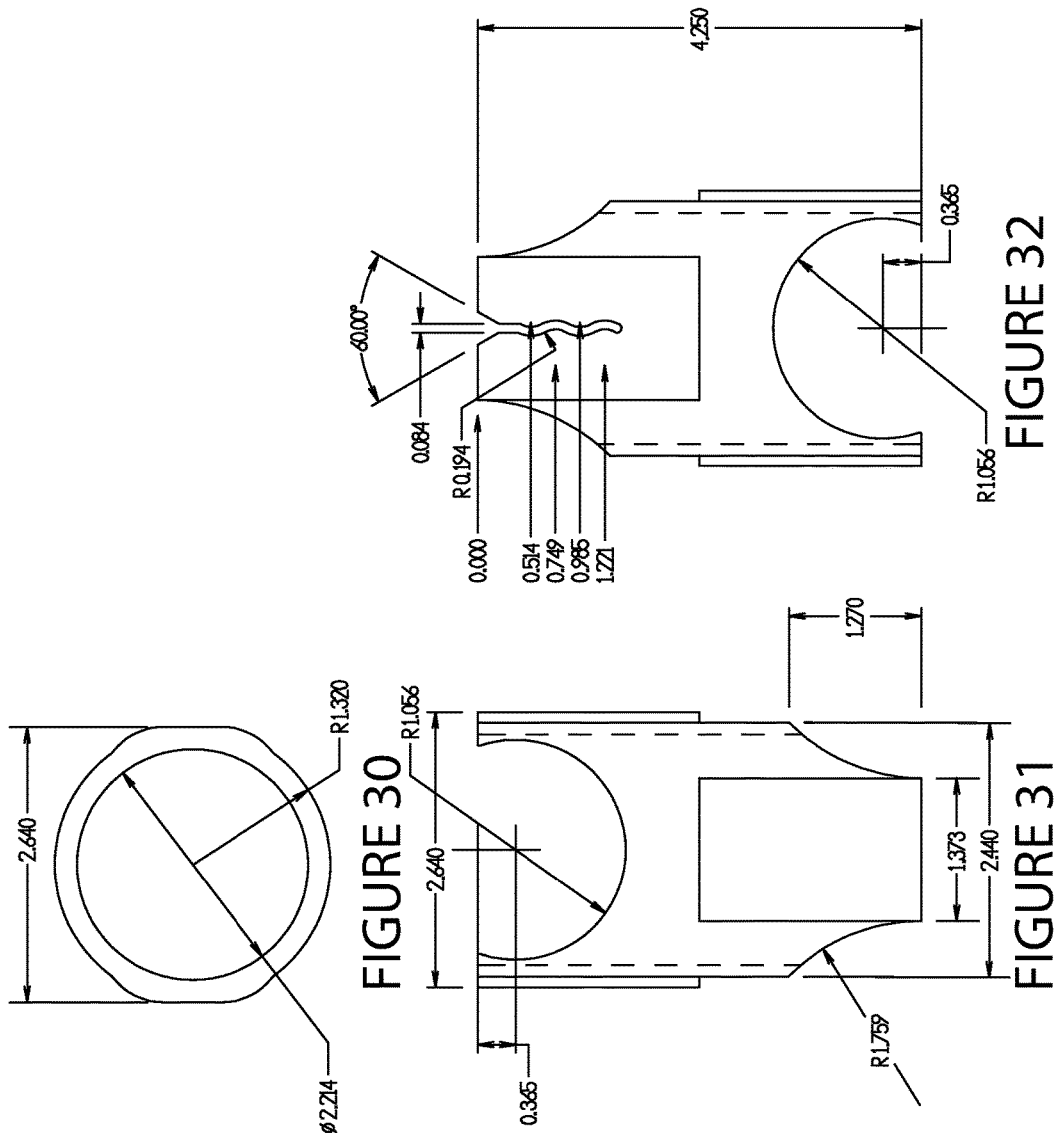

MODULAR BARRIER

FIELD OF THE INVENTION

This invention relates generally to safety barricades, and, more particularly, to a modular barrier kit comprising elements that may be erected and configured to warn and/or guide traffic, cordon off and/or conceal an area, and even provide temporary shelter.

BACKGROUND

First responders, including police, frequently must guide traffic, protect and rope off an accident or crime scene, warn pedestrians and motorists of dangerous conditions, and shelter an area and/or first responders from sun and precipitation. Unfortunately, devices readily available in police and emergency personnel vehicles are often inadequate for one or more of the aforementioned tasks.

What is needed is a relatively inexpensive and lightweight kit that can be conveniently stored in a vehicle, and quickly and intuitively erected and configured, without tools, to provide a barrier to accomplish any one or more of the following: guide traffic, protect and rope off an accident or crime scene, warn pedestrians and motorists of dangerous conditions, and shelter an area and/or first responders from sun and precipitation.

The invention is directed to overcoming one or more of the problems and solving one or more of the needs as set forth above.

SUMMARY OF THE INVENTION

To solve one or more of the problems set forth above, in an exemplary implementation of the invention, a kit contains mast modules that may be erected and connected in a variety of configurations to provide a barrier to accomplish any one or more of the following: guide traffic, protect and rope off an accident or crime scene, warn pedestrians and motorists of dangerous conditions, and shelter an area and/or first responders from sun and precipitation. Each mast module includes a tubular mast that is mountable to a support base. The mast also includes a coupler with a u-shaped slot for receiving an orthogonal mast. The mast also includes bolts and key slots positioned apart from the u-shaped opening. The bolts and key slots may be used to couple masts. Using the various connections, a wide variety of framework configurations are possible. The coupler of each mast includes undulating slots for retaining signage. Each mast may also include retro-reflective elements near the coupler end of the mast. Optional additional features include a top post with a rounded end for supporting a tent-like tarp. Additionally, the base may contain batteries that supply regulated electric power to one or more outlets in the mast. Elements of a kit may be contained in a case, which may also serve as a flotation device.

A modular barrier according to principles of the invention may be made using a plurality of masts, including a first mast, a second mast and a third mast. In one basic configuration, the first mast is spaced apart from and generally parallel to the second mast. The third mast is generally parallel to and releasably attached, either directly or indirectly, to the first and second masts. Various structures may be constructed using repeated coupled assemblies of this basic configuration.

Each mast of the plurality of masts includes a hollow tube, a plurality of key slots and a coupling bolt. The hollow tube has a first end and a second end opposite the first end, a longitudinal axis extending from the first end to the second end, a length of at least two feet, a wall, a wall thickness, an outer surface of the wall, an inner surface of the wall, an outer diameter, an inner diameter, a first key slot adjacent to the first end, and a second key slot adjacent to the second end and in circumferential alignment with the first key slot.

Each key slot is an aperture in the hollow tube. The aperture includes a first aperture portion and a second aperture portion extending from the first aperture portion. Optionally, there may be a third aperture portion extending from the first aperture portion opposite the second aperture portion. The first aperture portion has a first aperture width. The second aperture portion has a second aperture width. The second aperture width is less than the first aperture width.

The coupling bolt is attached to the hollow tube between the first end and the first key slot. The coupling bolt has a shank with a shank width and shank length extending radially from the outer surface of the hollow tube and terminating at a head. The head has a head width that exceeds the shank width and exceeds the second aperture width and is not greater than the first aperture width. The shank length is at least about the wall thickness. The first aperture portion is sized and shaped to receive the head. The second aperture portion is sized and shaped to receive the shank and prevent radial removal of the head when the shank is received in the second aperture portion.

In one implementation, the coupling bolt of the first mast is received in the first key slot in the third mast with the shank of the coupling bolt of the first mast is received in the second aperture portion of the first key slot in the third mast. The coupling bolt of the second mast is received in the second key slot of the third mast with the shank of the coupling bolt of the second mast is received in the second aperture portion of the second key slot in the third mast. The coupling bolt of the first mast is removable from the first key slot in the third mast and the coupling bolt of the second mast is removable from the second key slot of the third mast by rotating the third mast to align the head of the coupling bolt of the first mast with the first aperture portion of the first key slot in the third mast while aligning the head of the coupling bolt of the second mast with the first aperture portion of the second key slot in the third mast.

In one implementation, more than one coupling sleeve, e.g., first and second coupling sleeves, are provided. Each coupling sleeve includes a hollow sleeve having a union end, a free end opposite the union end, and a longitudinal coupling axis extending from the union end to the free end. The union end has an inner diameter that is about equal to the outer diameter of each mast.

A slot is formed in the free end of the coupling sleeve. The longitudinal coupling axis is an axis of symmetry for the slot. The slot has a semicircular shape and includes an opening having an opening width, an intermediate portion having an intermediate width, and a vertex. The distance from the vertex to the opening of the slot is greater (even if just slightly greater) than one half of the outer diameter of each mast. The intermediate width is about equal to the outer diameter of each mast. The opening width is deformable from a relaxed state to a spread state. In the relaxed state it is less than the outer diameter of each mast. In the spread state it is at least as great as the outer diameter of each mast. The slot is oriented to receive a portion of a mast oriented orthogonal to longitudinal coupling axis.

In one configuration, the union end of the first coupling sleeve mates with the first end of the first mast and the union end of the second coupling sleeve mating with the first end of the second mast. The slot of the first coupling sleeve may then receive the first end of the third mast. The slot of the second coupling sleeve receives the second end of the third mast.

In another embodiment, each coupling sleeve further includes a pair of spaced apart tabs between the slot formed in the free end of the coupling sleeve. Each tab including a narrow slit extending from the free end to an intermediate point between the free end and the union end and generally parallel to the longitudinal coupling axis. The narrow slit is preferably an undulating slit. Such a slit is useful for gripping tape, such as caution tape.

In another configuration, the union end of the first coupling sleeve mates with the first end of the first mast and the union end of the second coupling sleeve mates with the first end of the second mast. In this configuration, a tape may extend from at least one of the undulating slits of the first coupling sleeve to at least one of the undulating slits of the second coupling sleeve. The undulating slits grip the tape.

In another configuration, the free end of each coupling sleeve is sized to receive a second end of each mast in alignment with the longitudinal coupling axis.

In another embodiment, additional masts, including a fourth mast and a fifth mast are provided. In this embodiment, the union end of the first coupling sleeve mates with the first end of the first mast, and the union end of the second coupling sleeve mates with the first end of the second mast, and the second end of the fourth mast is received in the free end of the first coupling sleeve. The fourth mast and the first mast are in axial alignment. The second end of the fifth mast is received in the free end of the second coupling sleeve. The fifth mast and the second mast are in axial alignment and generally parallel to the fourth mast and the first mast.

In another embodiment, an additional mast, i.e., a fourth mast, and an additional coupling sleeve, i.e., a third coupling sleeve, are provided. In this embodiment, the union end of the first coupling sleeve mates with the first end of the first mast, and the union end of the second coupling sleeve mates with the first end of the second mast, and the union end of the third coupling sleeve mates with the first end of the third mast. The second end of the fourth mast is received in the free end of the third coupling sleeve. The fourth mast and the third mast are in axial alignment. The slot of the first coupling sleeve receives the first end of the third mast. The slot of the second coupling sleeve receives the second end of the fourth mast.

Bases may be provided to support one or more masts vertically. One embodiment may include a first base and a second base. Each base may include a broad base having a base length that is at least three times the outer diameter of each mast, and a base width that is at least three times the outer diameter of each mast, and a base thickness that is at least as great as a distance from the second end of each mast to the second key slot of each mast (e.g., at least an inch thick). The base includes a generally central mortise (i.e., socket) that is shaped and sized to securely receive and frictionally engage the second end of each mast. The central mortise may include a base sleeve having a non-circular outer circumference shape. The base sleeve may be received securely in a central aperture in the base. The second end of the first mast may be received in the central mortise (e.g., in base sleeve of the central mortise) of the first base. The second end of the second mast may be received in the central mortise (e.g., in base sleeve of the central mortise) of the second base.

In another embodiment, masts are equipped with reflectors, such as retro-reflective sleeves. Each retro-reflective sleeve includes a plurality of adjoining panels (e.g., 3) defining an interior channel bound by a plurality of exterior planar surfaces (e.g., 3). Each exterior planar surface includes a retro-reflective element. The interior channel is sized to receive each mast. Each mast includes a midpoint between the first end and the second end. The first retro-reflective sleeve receives a portion of the first mast, between the first end and the midpoint of the first mast, and is secured to the received portion of the first mast with an attachment.

In another embodiment, a top mast with a rounded free end is provided for supporting a tarp or other cover without puncturing it. An exemplary top mast includes a mast with a hemispherical cap attached to the first end. The second end of the top mast is received in the free end of the first coupling sleeve.

BRIEF DESCRIPTION OF THE DRAWINGS

The foregoing and other aspects, objects, features and advantages of the invention will become better understood with reference to the following description, appended claims, and accompanying drawings, where:

FIG. 13 is a symbolic representation an exemplary barricade module according to principles of the invention; and FIG. 14 is a symbolic representation of exemplary coupled barricade modules as in FIG. 8 according to principles of the invention; and FIG. 15 is a symbolic representation of exemplary coupled barricade modules as in FIG. 9 according to principles of the invention; and FIG. 16 is a symbolic representation of exemplary coupled barricade modules as in FIG. 10 according to principles of the invention; FIG. 30 provides a dimensioned plan view of an exemplary coupling sleeve with two slots formed in opposed ends for a modular barrier according to principles of the invention;

FIG. 31 provides a dimensioned first side view of an exemplary coupling sleeve with two slots formed in opposed ends for a modular barrier according to principles of the invention;

FIG. 32 provides a dimensioned second side view of an exemplary coupling sleeve with two slots formed in opposed ends for a modular barrier according to principles of the invention;

Figure 1:
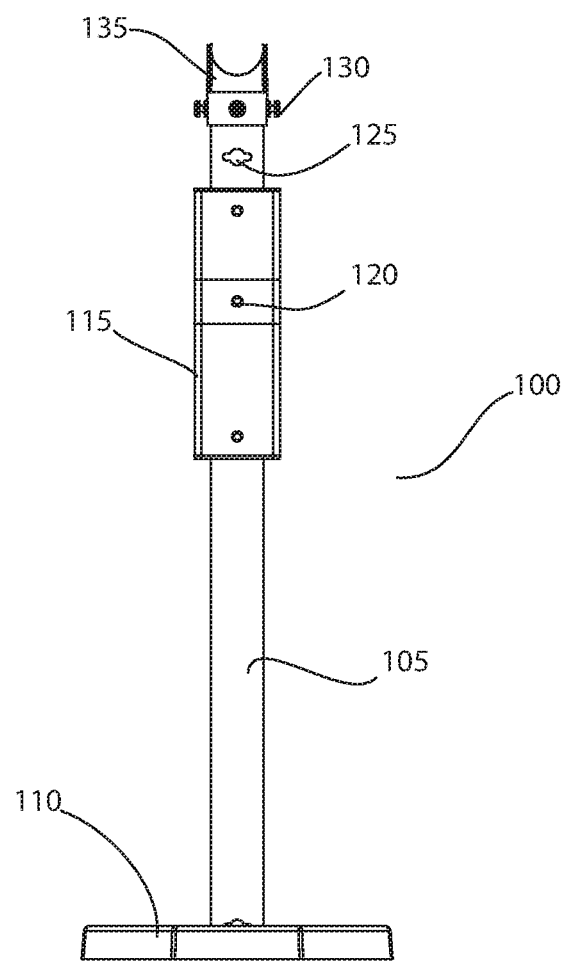
FIG. 1 is a front view of an exemplary barricade module according to principles of the invention.
Figure 2:
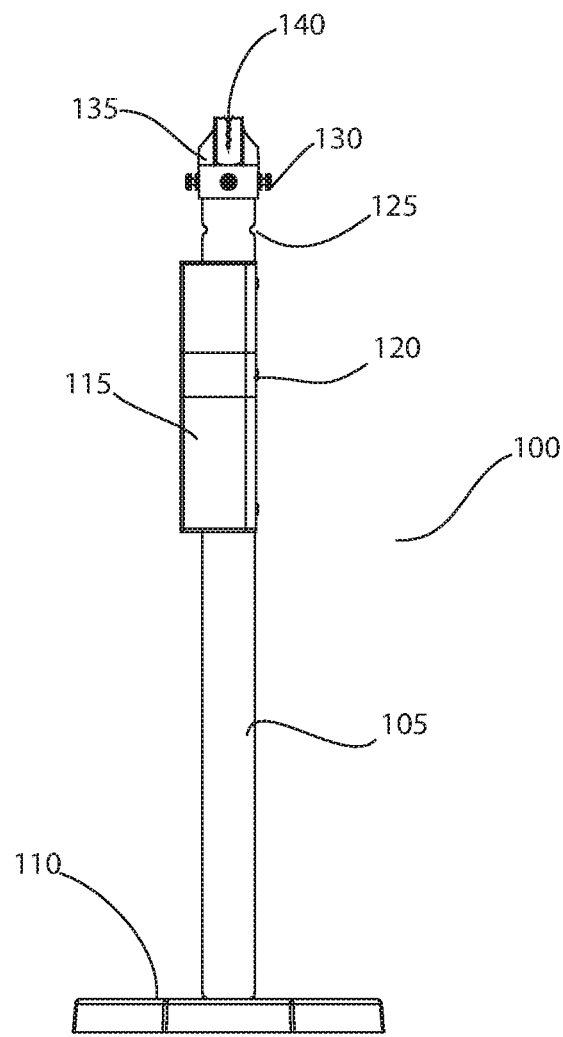
FIG. 2 is a side view of an exemplary barricade module according to principles of the invention.
Figure 3:
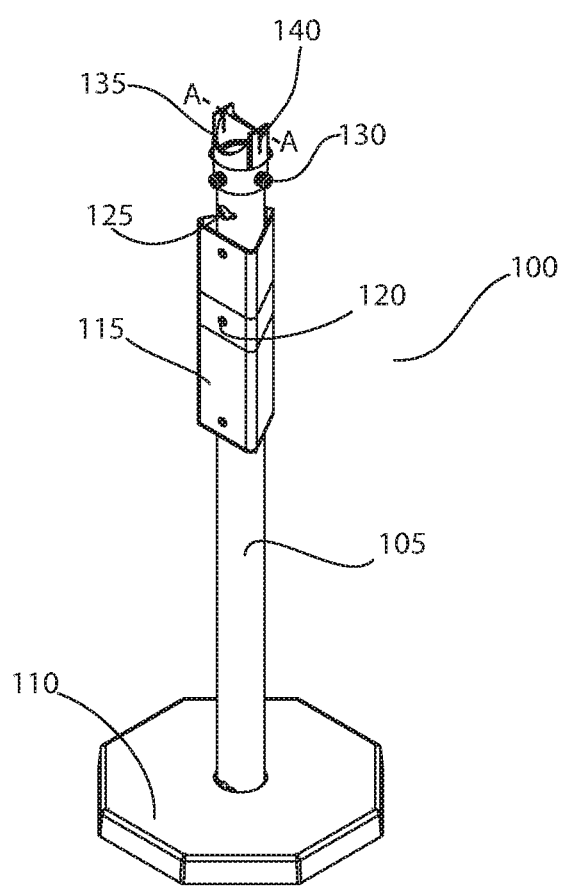
FIG. 3 is a perspective view of an exemplary barricade module according to principles of the invention.
Figure 4:
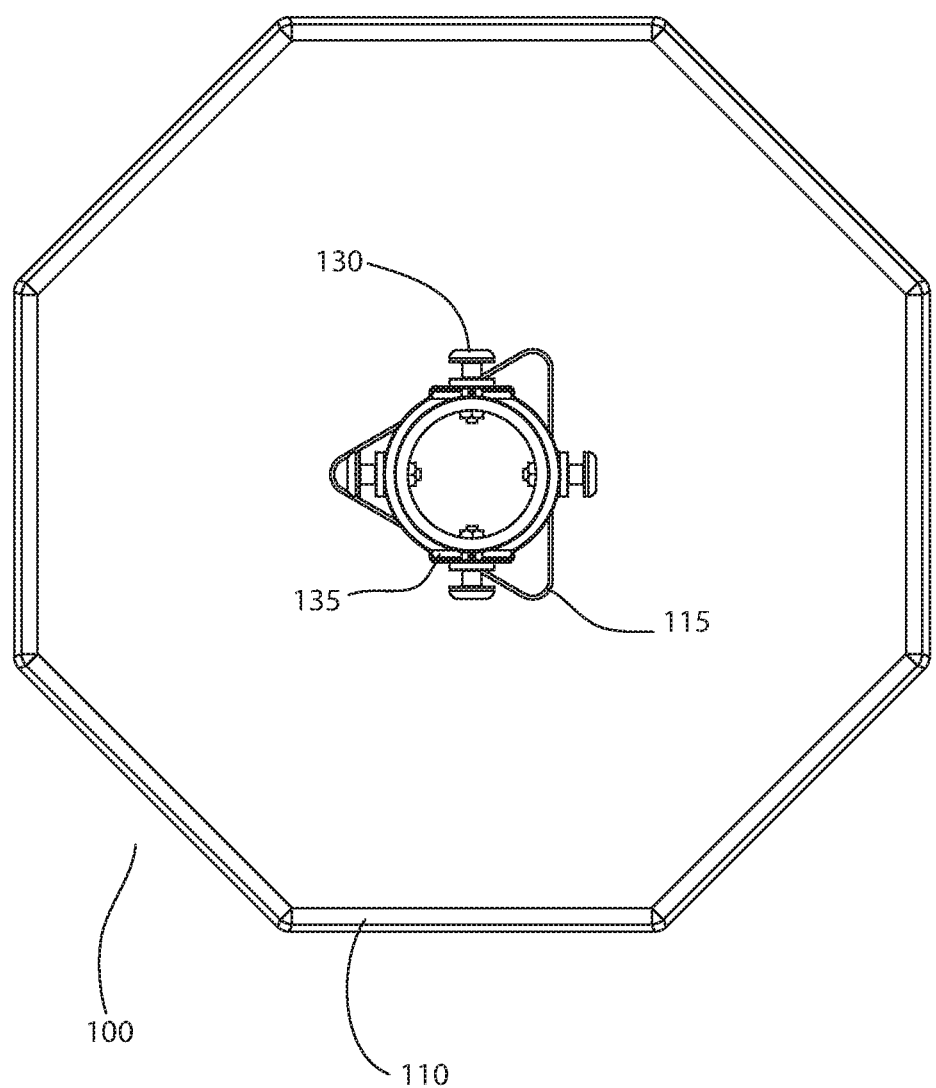
FIG. 4 is a plan view of an exemplary barricade module according to principles of the invention.
Figure 5:
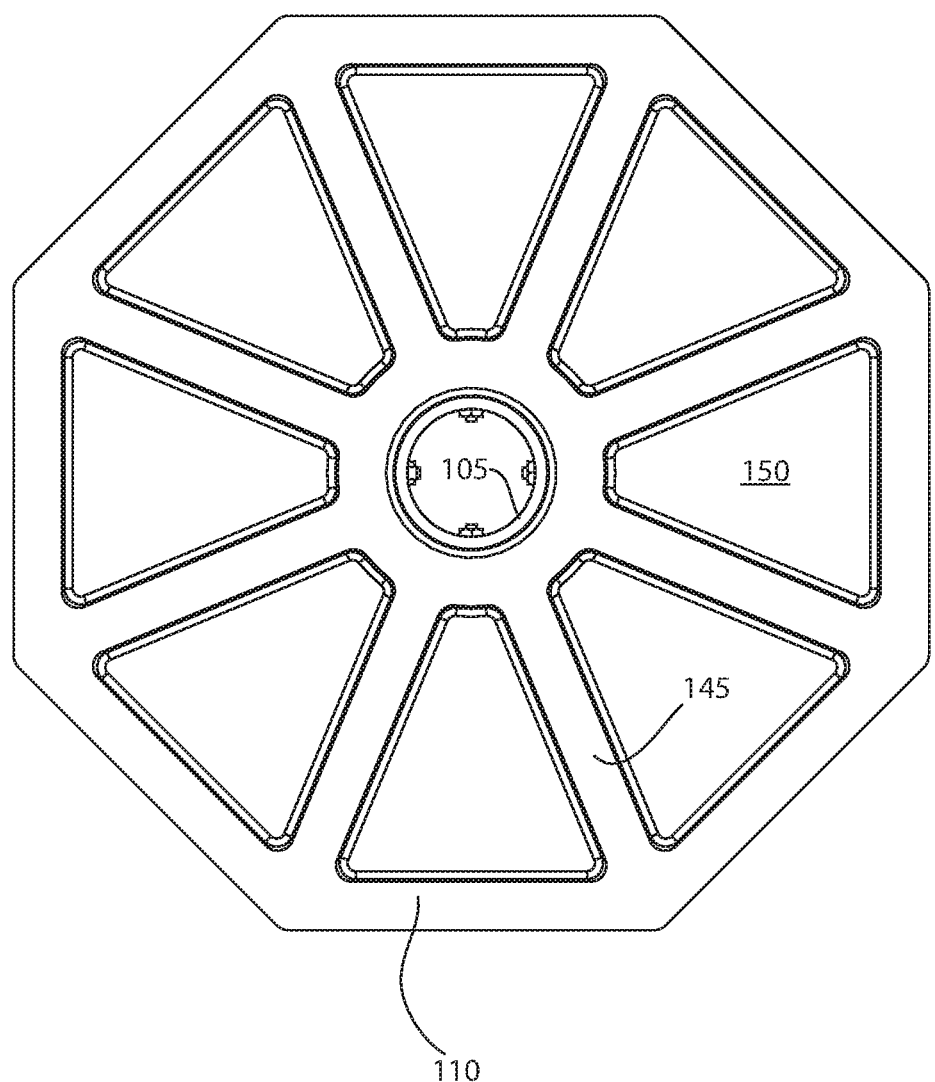
FIG. 5 is a bottom view of an exemplary barricade module according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Referring to FIGS. 1 through 5 various views of an exemplary barricade module of a kit according to principles of the invention is conceptually illustrated. The module 100 includes a mast 105 extending upwardly from a base 110. As discussed below, a mast 105 may be used without a base 110 and may be oriented horizontally or vertically, depending upon the configuration of a deployed barrier. The mast is preferably at least a few feet in length, e.g., from 2.5 to 5 feet, with 3 to 4 feet being particularly preferred. The outer diameter of the mast is preferably at least a few inches, e.g., from 2 to 6 inches in diameter. The mast is preferably comprised of a plastic material, more preferably an extruded tubular plastic material with a modulus and wall thickness to maintain sufficient rigidity and provide sufficient support during use. Non-limiting examples of suitable plastics include ABS, Acrylic Plexiglass®, Butyrate, Cellulose Acetate, Cellulose Acetate Butyrate-CAB, Cellulose Propionate, Polyethtylene such as HDPE (High Density Polyethylene), PETG, Polycarbonate Lexan®, Polypropylene, Polystyrene (H.I.P.S) and (G.P.P.S.), and PVC. While a mast 105 with circular cross section is shown, the invention is not limited to a particular shape cross section.

A retro-reflector 115 is attached to the mast 105, a few inches (e.g., two to six inches) from an end of the mast 105. The retro-reflector 115 may be attached using one or more mechanical attachments 120, such as nuts and bolts, rivets, snap-fit couplings or other suitable connectors. The exemplary retro-reflector 115 comprises a triangular cross-section sleeve with spaced apart retro-reflective bands.

At least one key slot 125, preferably a plurality of key slots, is provided adjacent to each end of the mast 105. The key slot 125 is an oblong slot with a central circular opening through which the head of a bolt 130 may be admitted. The key slot 125 allows coupling of one or more additional masts.

At least one coupling bolt 130 is provided between the snap fit coupler 135 and the key slot 125. In a preferred embodiment, four bolts spaced about 90 degrees apart extend radially from mast 105. The coupling bolt includes a head with a diameter that is less than the diameter of the central circular opening of the key slot 125, but greater than the width of the oblong slot. The coupling bolt also includes a shank having a diameter that is less than the width of the oblong slot. Thus, when the head is received in the circular opening and slid behind the oblong slot portion, the head resists separation or withdrawal through the oblong slot.

One end of the mast includes a snap fit coupler 135. Discussed in more detail below, the coupler 135 defines an aperture (i.e., a generally u-shaped aperture) that grips the periphery of an engaged orthogonal mast 105 or an engaged aligned mast. The coupler 135 also provides undulating slits 140 for securely receiving an edge of a sign or tape.

The base 110 provides sufficient area and weight to hold the mast 105 upright. The mast 105 mates with the base 110 by threading or plugging into a mating aperture in the base. The base is preferably comprised of a dense elastomer with sufficient rigidity for support and structural integrity. Reinforcing ribs 145 may be provided between cavity sections 150 in the base to enhance structural integrity while limiting the amount of material used to coserve weight and manufacturing cost.

In one embodiment, a frictional engagement holds the engaged end of the mast 105 in the base. In such an embodiment, the base may contain a collar with a non-circular flange. The collar is embedded in the base, e.g., molded into the base during manufacturing. In this embodiment, the collar must withstand the temperatures of molding the base. The embedded flange resists rotation of the collar. The collar may comprise an injection molded plastic structure with surfaces to enhance frictional engagement. The collar may be comprised of a material different from the base.

In another embodiment, the collar is mated (e.g., press-fit, snap-fit, threaded or bonded) into a mating socket formed (e.g., molded) in the base. In this embodiment, the collar does not have to withstand the manufacturing temperature of the base.

Figure 6:
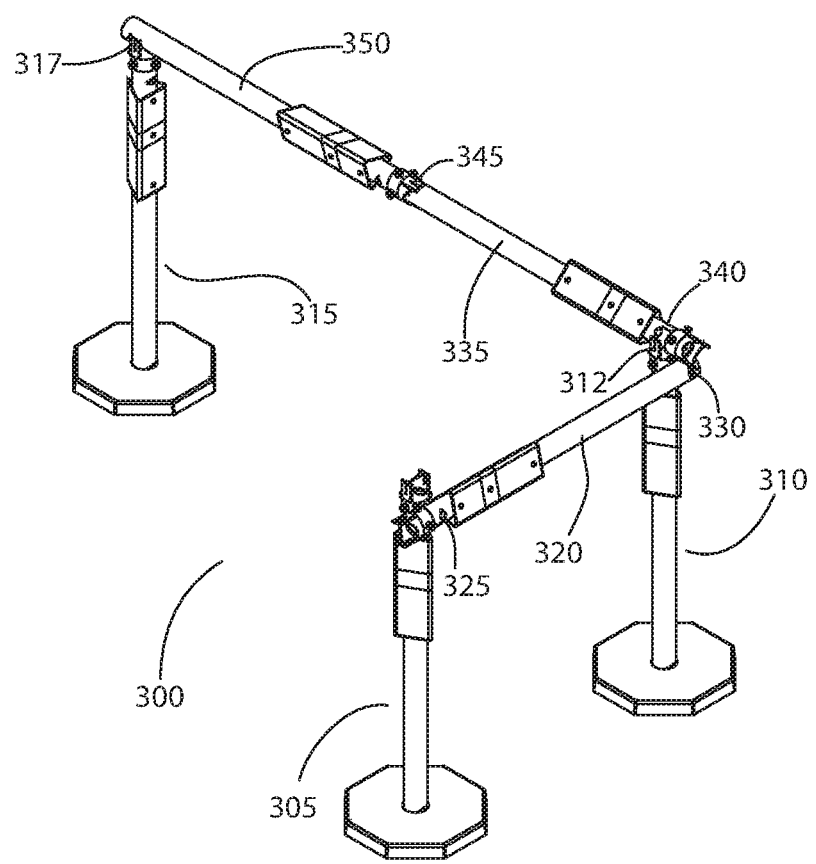
FIG. 6 is a perspective view of an exemplary barricade comprised of a plurality of barricade modules according to principles of the invention.

Referring now to FIG. 6, a perspective view of an exemplary barricade 300 comprised of a plurality of barricade modules according to principles of the invention is conceptually illustrated. The barricade includes three upright masts 305, 310, 315 supporting three horizontal masts 320, 335, 350. One mast 320 is coupled to supporting upright masts 305, 310 by coupling bolts of the upright masts 305, 310 extending into key slots 325, 330 at each end of the supported horizontal mast. Each of mast 335, 350 is supported at its free end by a snap fit coupler 312, 317. The snap fit coupler 345 of one horizontal mast 350 receives and engages the end of the mating aligned horizontal mast 335. Mast 335 is gripped by coupler 312 at the portion 340 between the retro-reflector and coupler of mast 335. The use of bolts and the coupler allow the various horizontal masts to be engaged without interference because the bolts are positioned sufficiently below the coupler to avoid interference between mast 320 and mast 335.

Figure 7:
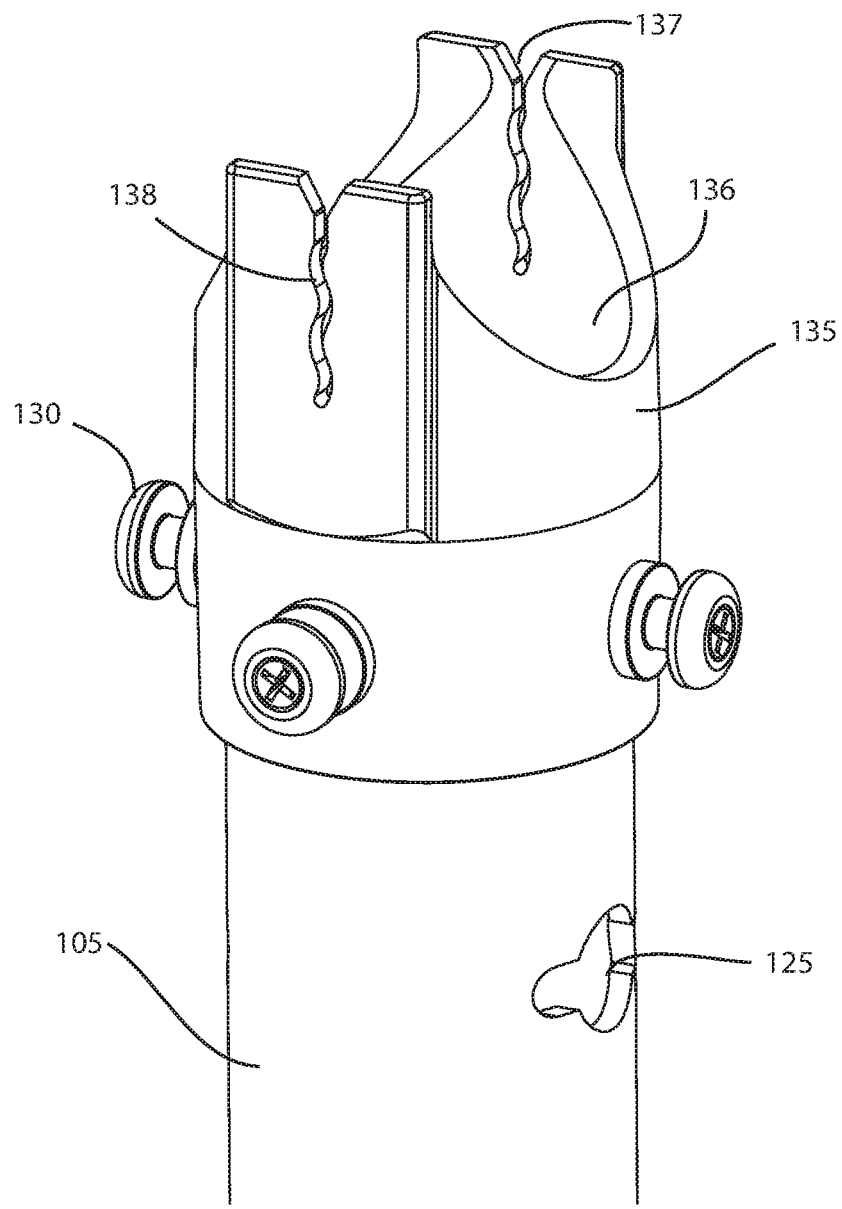
FIG. 7 is a perspective view of a portion of an exemplary barricade module according to principles of the invention.

FIG. 7 provides a perspective view of a coupler portion of an exemplary barricade module according to principles of the invention. The coupler 135 is a hollow sleeve with a generally u-shaped opening 136 flanked by undulating (i.e., wavy) slots 137, 138. The undulating slots secure signs to the coupler 135. The hollow interior of the sleeve-like coupler is sized to securely receive the mating end of an aligned mast. The u-shaped opening 136 is sized and shaped to provide a snap fit connection with an orthogonal mating mast. Coupling bolts 130 and key slots 125 are also more clearly visible in FIG. 7.

Figure 8:
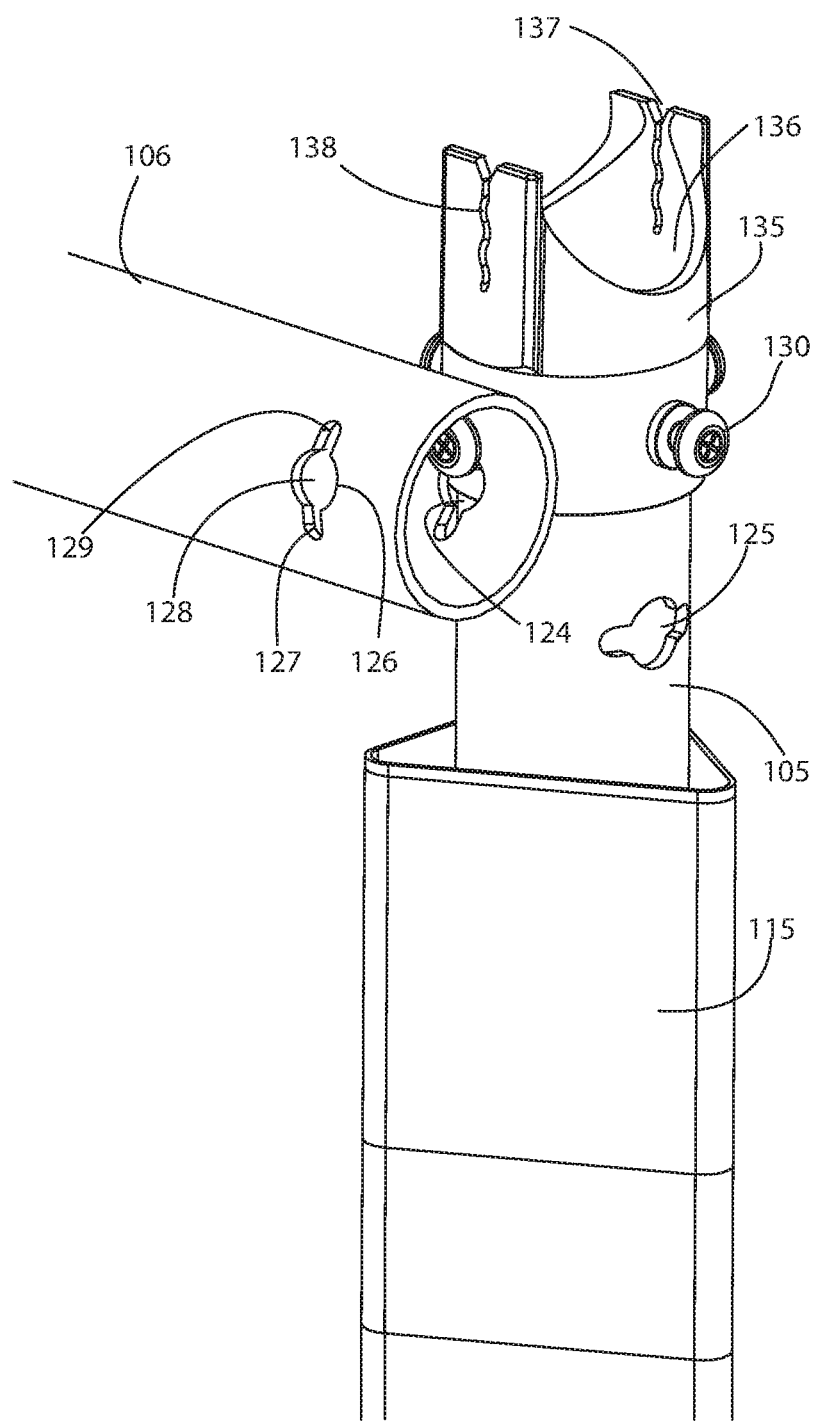
FIG. 8 is a perspective view of coupled portions of exemplary barricade modules according to principles of the invention.

Referring now to FIG. 8, a perspective view of coupled portions of exemplary barricade modules according to principles of the invention are provided. In this embodiment, the horizontal mast 106 includes a pair of opposed key slots 124, 126, each having a central opening 129 flanked by narrower oblong slots 127, 129. A bolt 130 of the vertical mast 105 engages the key slot 124 of the horizontal mast. This engagement positions the horizontal mast 106 below the bottom of the u-shaped opening 136 in the coupler 135. Thus, a horizontal mast may be coupled by a bolt while another parallel or orthogonal horizontal mast may be coupled by the coupler.

Figure 9:
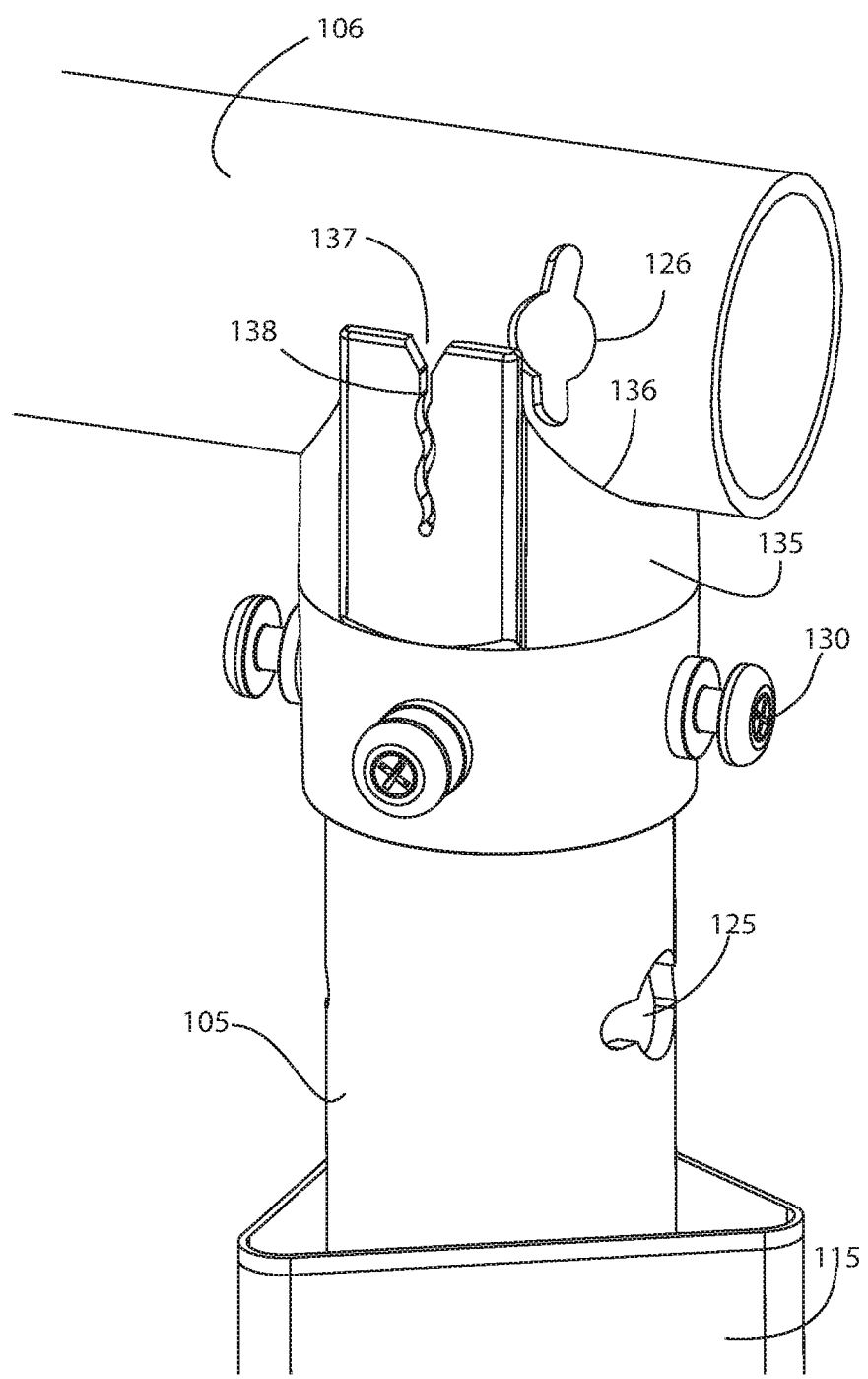
FIG. 9 is another perspective view of coupled portions of exemplary barricade modules according to principles of the invention.

With reference to FIG. 9, another perspective view of coupled portions of exemplary barricade modules according to principles of the invention is provided. The horizontal mast 106, is now engaged in the u-shaped opening of the coupler 135.

Figure 10:
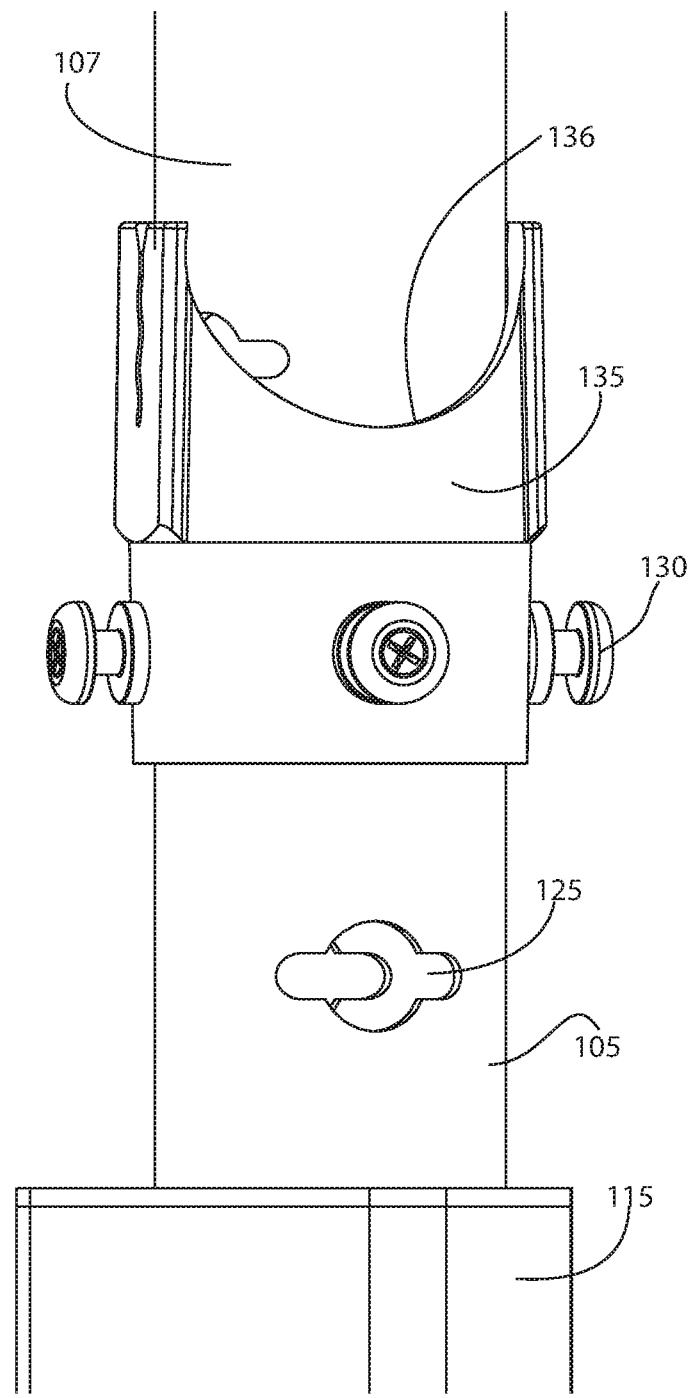
FIG. 10 is another perspective view of coupled portions of exemplary barricade modules according to principles of the invention.

In FIG. 10 another perspective view of coupled portions of exemplary barricade modules according to principles of the invention is provided. Here, an end 107 of a couple mast is aligned with the coupler 135. The end 107 of the aligned mast is securely received in the coupler 135.

Figure 11:
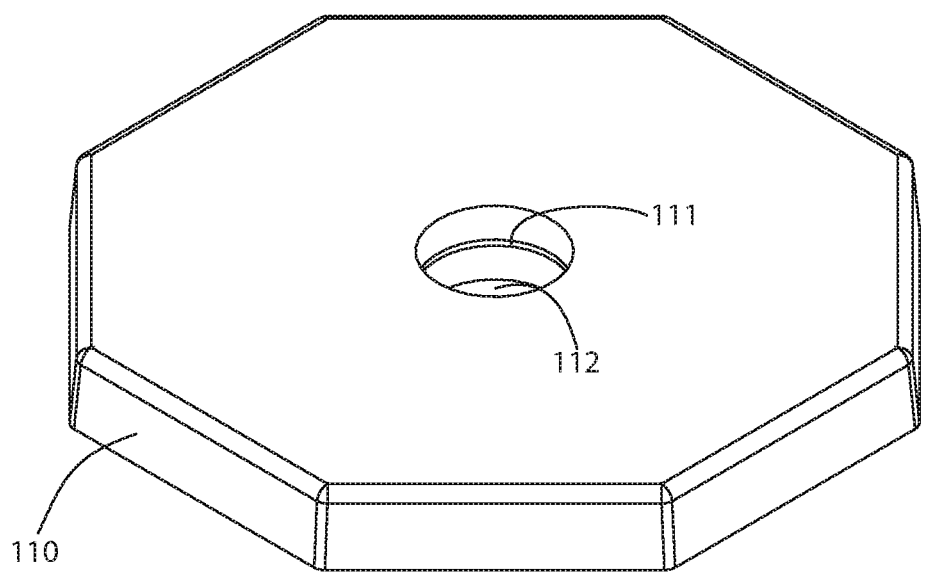
FIG. 11 is a perspective view of a base of an exemplary barricade module according to principles of the invention.
Figure 12:
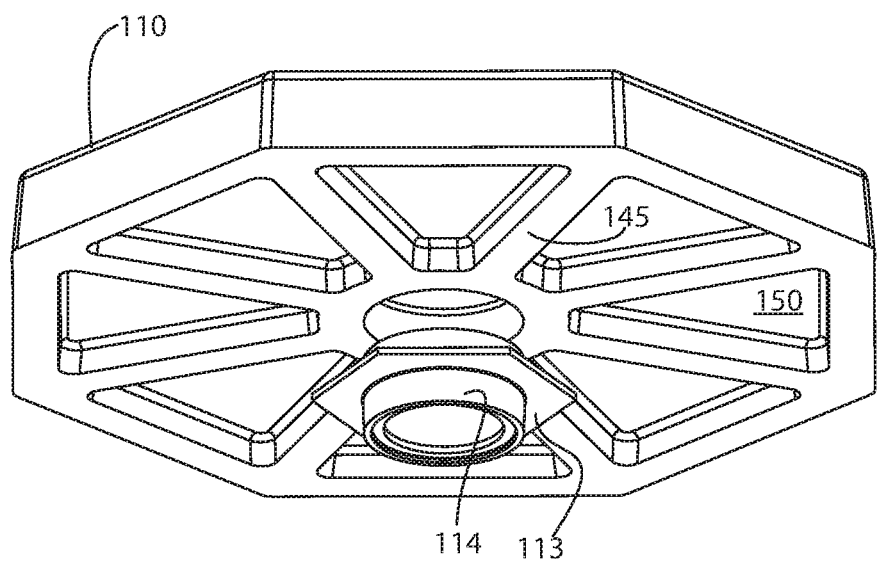
FIG. 12 is another perspective view of a base of an exemplary barricade module according to principles of the invention.

FIGS. 11 and 12 provide perspective views of a base 110 of an exemplary barricade module according to principles of the invention. The bottom of the base includes stiffening ribs 145 between depressed regions or cavities 150. A flanged collar 114 is shown separated from the base 110. During manufacturing, the flanged collar 114 is embedded in the base 110. The noncircular flange 113 resists rotation. The end of the mast 105 supported by the base is frictionally engaged by the collar 114. The mast is removable from the base, Other mountings, including threaded mountings are feasible and come within the scope of the invention.

Figure 17:
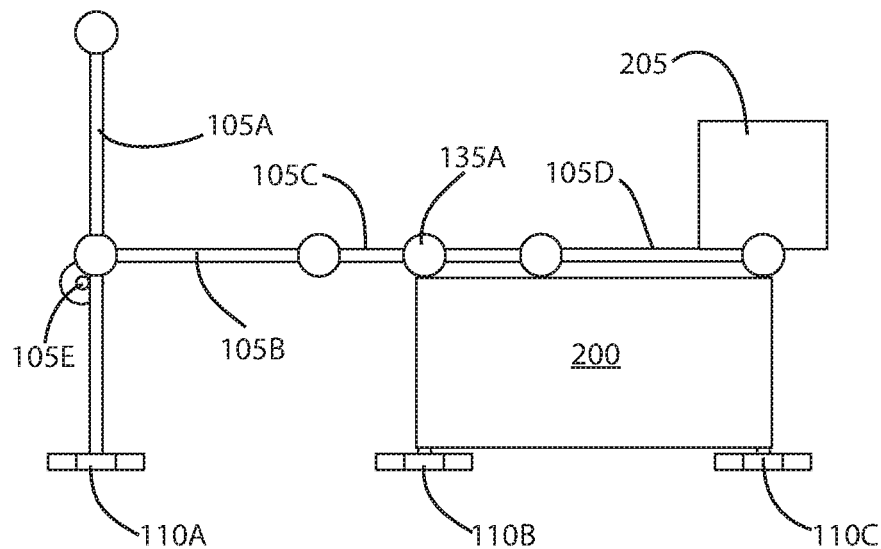
FIG. 17 is a symbolic representation of a barricade comprised of exemplary coupled barricade modules according to principles of the invention.
Figure 18:
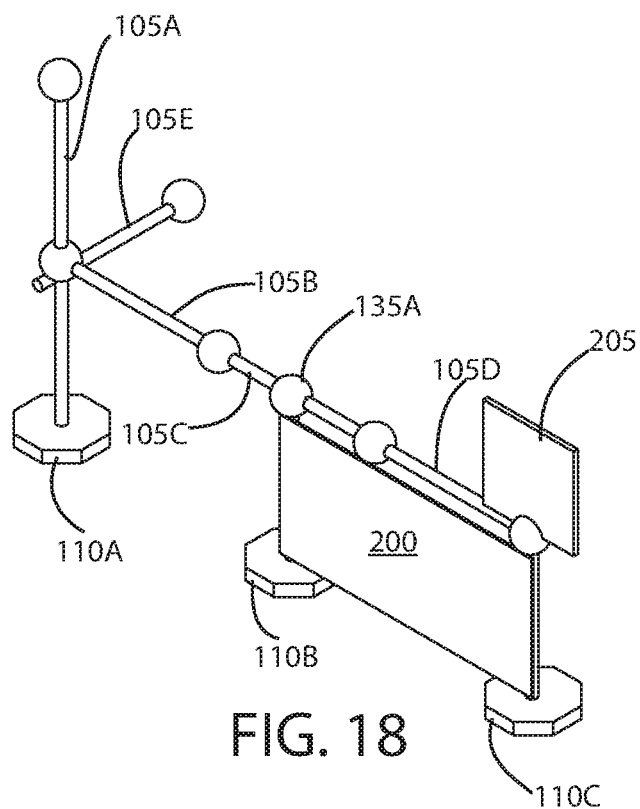
FIG. 18 is a perspective symbolic representation of a barricade comprised of exemplary coupled barricade modules according to principles of the invention.

FIGS. 13 through 16 symbolically represent a mast on a base and the various connections shown in FIGS. 8, 9 and 10. These symbolic representations are utilized in FIGS. 17 and 18. FIGS. 17 and 18 conceptually illustrate a range of connections, including a plurality of horizontal, aligned, mating masts 105B, 105C, 105D joined in alignment at their couplers, as in FIG. 10. Similarly, a vertical mast 105A is joined in alignment at the coupler of the mast below it. Another mast 105E extends orthogonally from that juncture, with mast 105E being connected by a bolt extending through its key slot, as in FIG. 8. The couplers of vertical masts, each having a base 110A, 110B, 110C, support the plurality of horizontal aligned masts 105B, 105C, 105D. A sign 205 is shown engaged in the undulating slots of a coupler. A sheet 200 is also shown attached to the framework of modules. A plurality of signs and sheets may be used to provide messages (e.g., caution, warning, do not cross, etc) and shelter and concealment.

Figure 19:
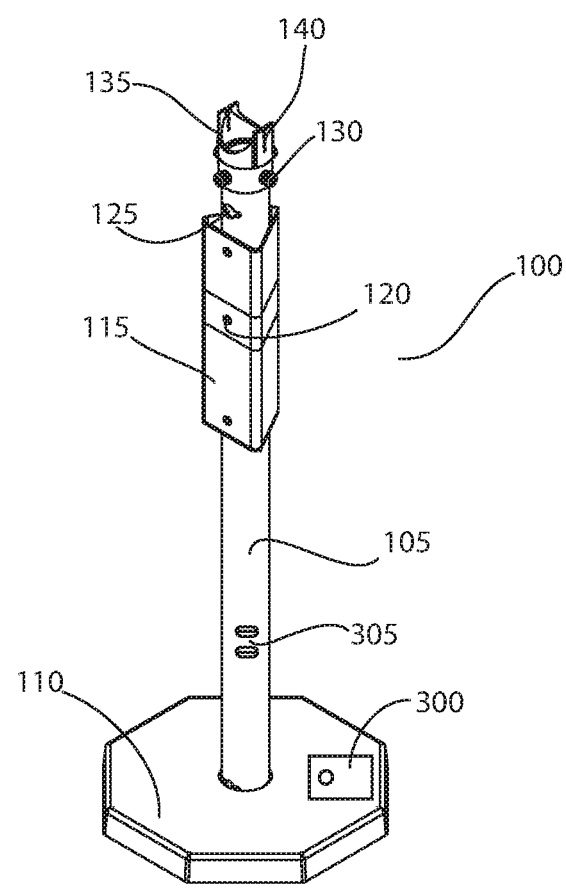
FIG. 19 is a perspective view of an exemplary barricade module according to principles of the invention.

In the embodiment of FIG. 19 a battery compartment 300 is provided in the base 110, with a plurality of outlets 305 in the mast 105 and wiring therebetween. The batteries may be used to recharge electronic devices (e.g., phones) or power accessories, e.g., lights and fans. The outlets may comprise USB ports, 12-volt outlets or any other suitable electrical outlet that can be powered by one or a plurality of batteries contained in the base 110.

Figure 20:
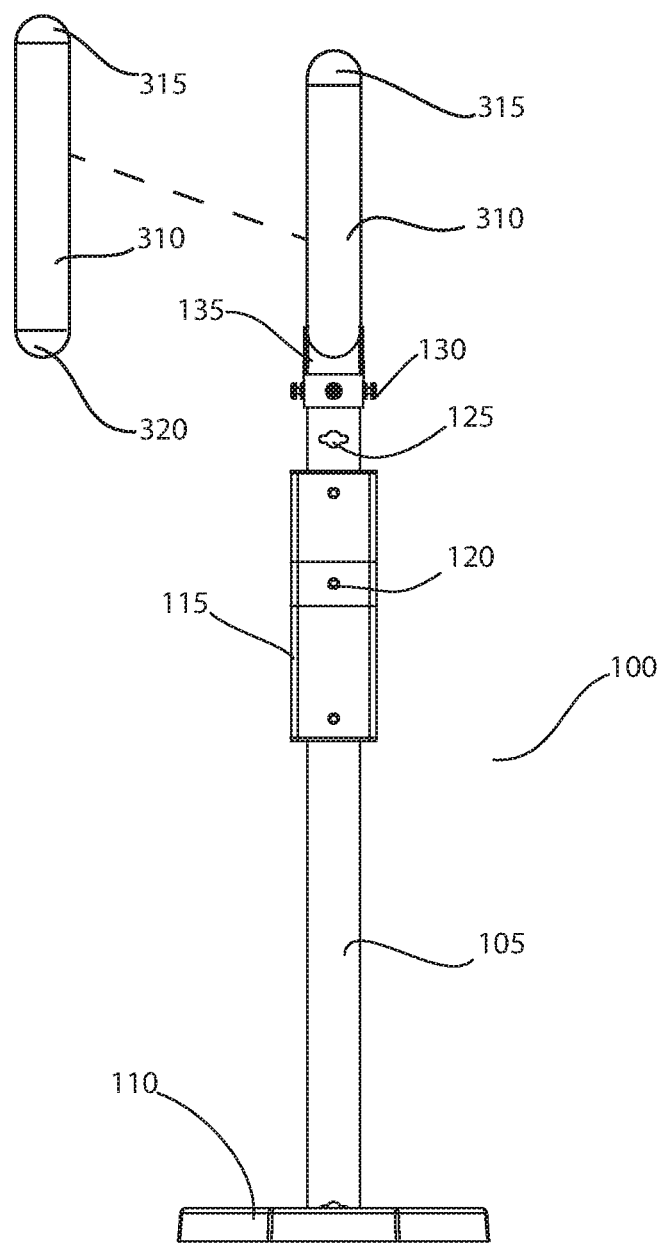
FIG. 20 is a front view of an exemplary barricade module with a top support according to principles of the invention.

In FIG. 20, a front view of an exemplary barricade module with a top support according to principles of the invention is provided. The top support may be used as post for holding up a tent. The top post 310 includes removable rounded (e.g., hemispherical) caps 315, 320. The top post 310 may be a hollow tube that is suitable for use for storage. Various items, such as tent stakes, may be contained in the top post. The top post 310 may be supported by one, two three or more vertically arranged masts 105, positioning the top post at a height that is suitable for the peak of a tent. Tent material (e.g., weatherproof nylon) may then be draped over the top post and appropriately staked or otherwise secured to the ground around a framework of modules that define the periphery of the tent. In this manner, the invention may be used to deploy a tent-like shelter.

Figure 21:
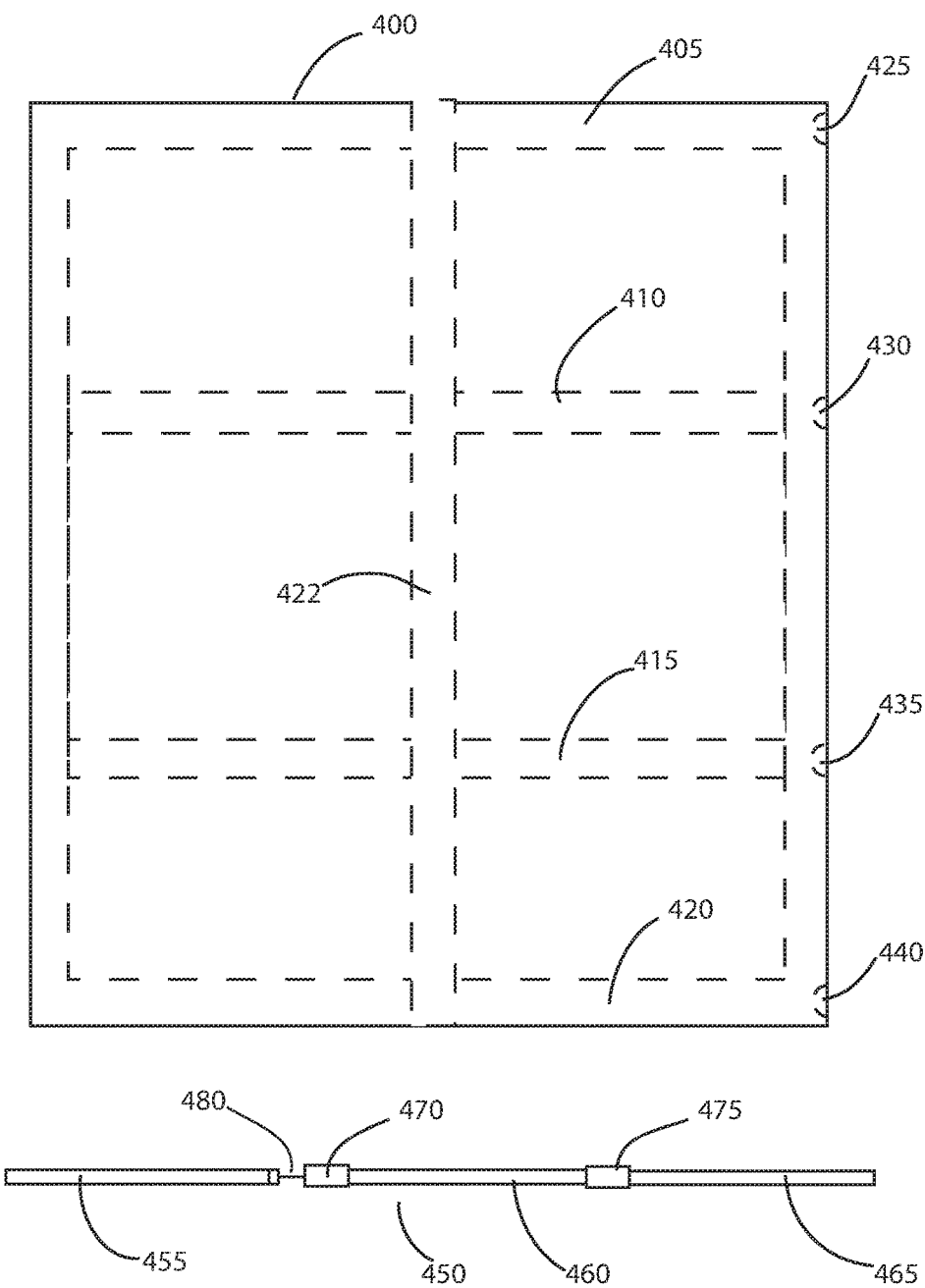
FIG. 21 is a plan view of an exemplary flexible sheet for a barricade according to principles of the invention.

With reference to FIG. 21, various sheets may be attached to sides of a framework constructed using the invention, such as sheet 200 in FIG. 18. While many flexible sheet materials may be adapted for use with the invention, one example is illustrated in FIG. 21. The exemplary sheet includes one or more channels 405-420 stitched into the sheet with one or more entrances 425-440, to receive one or more stiffeners. The stiffeners may comprise bendable tent poles, such as a tent pole 450 comprised of a plurality of segments 455-465, each engaged in a mating collar 470, 475, with elastic cord 480 urging the segments into an engaged position. In this manner, the sheet may be relatively lightweight, while exhibiting enhanced rigidity.

Figure 22:
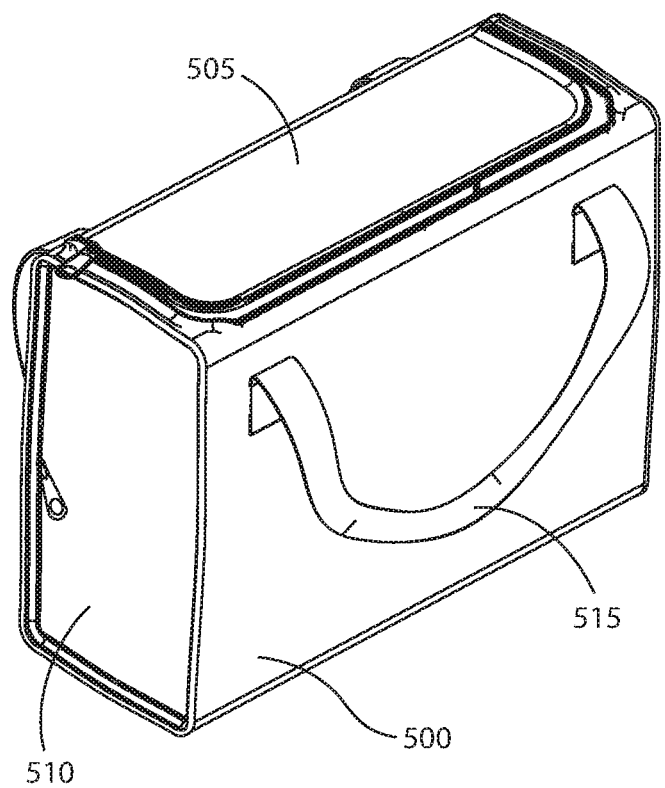
FIG. 22 is a perspective view of an exemplary container for a barricade kit according to principles of the invention.

Modules may be provided in kit form. A kit may include a plurality of masts, bases, top posts and other elements. Several police or other first responders may combine the elements of their kits to rapidly erect a suitable structure. Some or all of the elements of a kit may be contained in a carrying case. A nonlimiting example of such a case 500 is shown in FIG. 22. The case includes zippered closures 505, 510 and carrying handles. It is sized and shaped to receive the elements and fit in the storage compartment (e.g., trunk) of a vehicle. In a preferred embodiment the case is waterproof and made of a buoyant material. In an emergency, the case may be emptied and then deployed in water as a flotation device. Additionally, if the case with the contents of the kit is dropped in water, it should float rather than sink.

Figure 23:
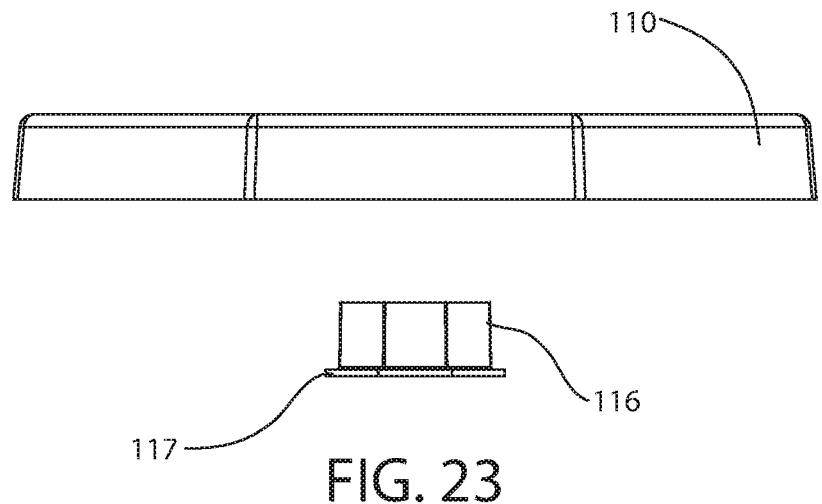
FIG. 23 is an exploded side view of another exemplary base of an exemplary barricade module according to principles of the invention.
Figure 24:
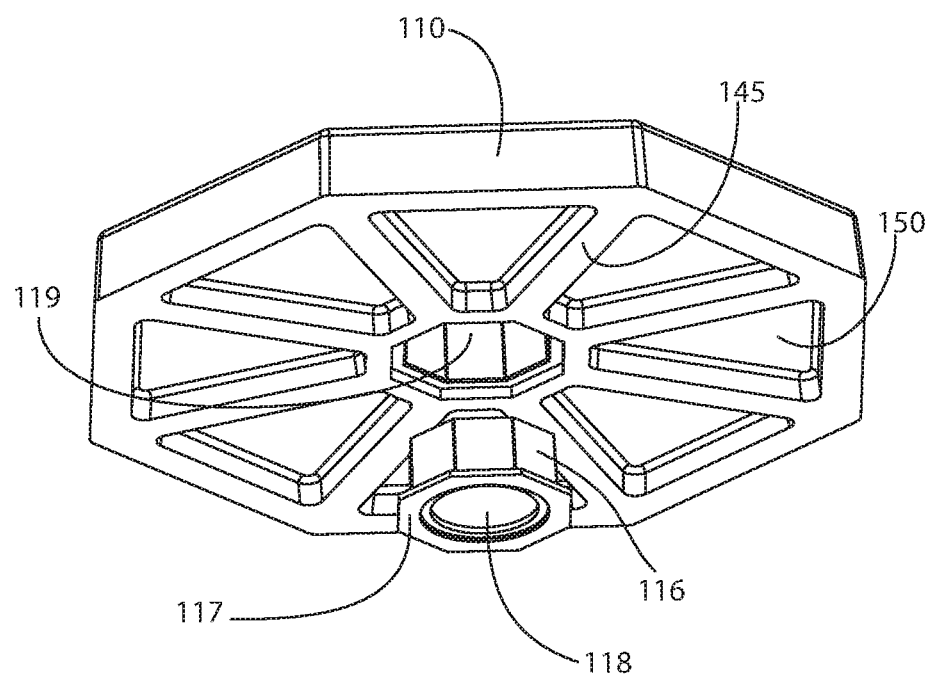
FIG. 24 is an exploded bottom perspective view of the exemplary base of FIG. 23.

In FIGS. 23 and 24 exploded views of another exemplary base of an exemplary barricade module according to principles of the invention are provided. The base 110 provides sufficient area and weight to hold the mast 105 upright. The mast 105 mates with the base 110 by threading or plugging into a mating aperture 118 in the collar 116. The collar 116 mates (e.g., is press-fit, snap-fit, threaded or bonded) into a mating socket 119 formed (e.g., molded) in the base 110. A non-circular flange 117 of the collar defines the extent of insertion and resists rotation of the inserted collar 116. The mating socket 119 is shaped and sized to snugly receive the collar 116 and the flange 117, with the flange 117 at the bottom of the base 110.

As with the base described above in relation to FIGS. 11 and 12, the base 110 of FIGS. 23 and 24 may also preferably be comprised of a dense elastomer with sufficient rigidity for support and structural integrity. Reinforcing ribs 145 may be provided between cavity sections 150 in the base to enhance structural integrity while limiting the amount of material used to coserve weight and manufacturing cost.

The collar 116 and flange 117 is installed (e.g., pressed) into the base 110 after the base has been manufactured. In this embodiment, the collar does not have to withstand the temperatures of molding the base. The flange 117 resists rotation of the collar. The collar 116 and flange 117 may comprise an injection molded plastic structure with textured surfaces to enhance frictional engagement. The collar 116 and flange 117 may be comprised of a material different from the base.

A modular barrier according to principles of the invention is made using a plurality of masts, such as a first mast, a second mast, a third mast and possibly more masts, as conceptually illustrated in FIG. 6, as well as the schematics of FIGS. 13-16 and 17-18. In one basic configuration, the first mast is spaced apart from and generally parallel to the second mast. The third mast is generally parallel to and releasably attached, either directly or indirectly, to the first and second masts. Various structures may be constructed using repeated coupled assemblies of this basic configuration.

Figure 25:
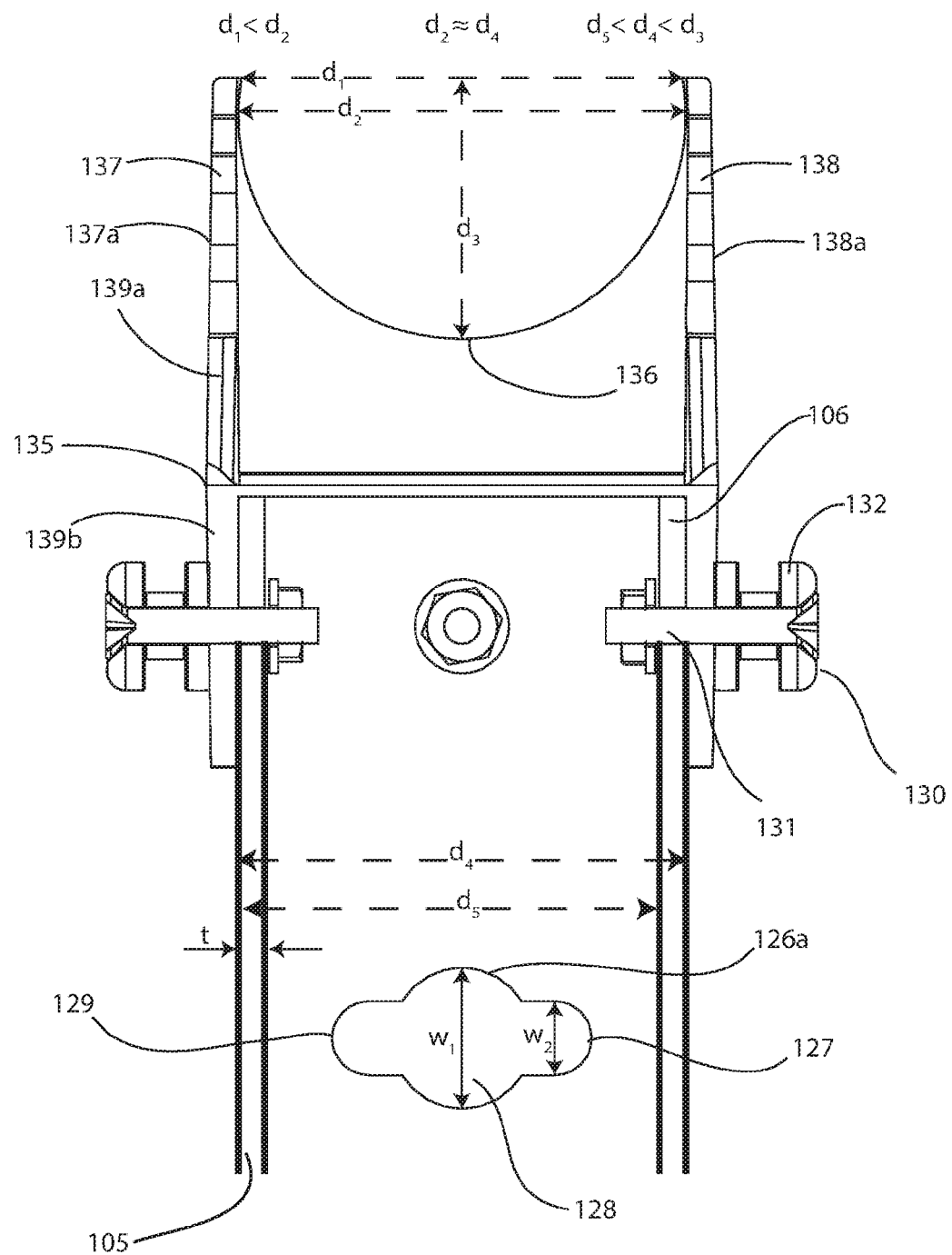
FIG. 25 is a section (A-A) view of an end of a mast engaging a coupling sleeve for a modular barrier according to principles of the invention.
Figure 26:
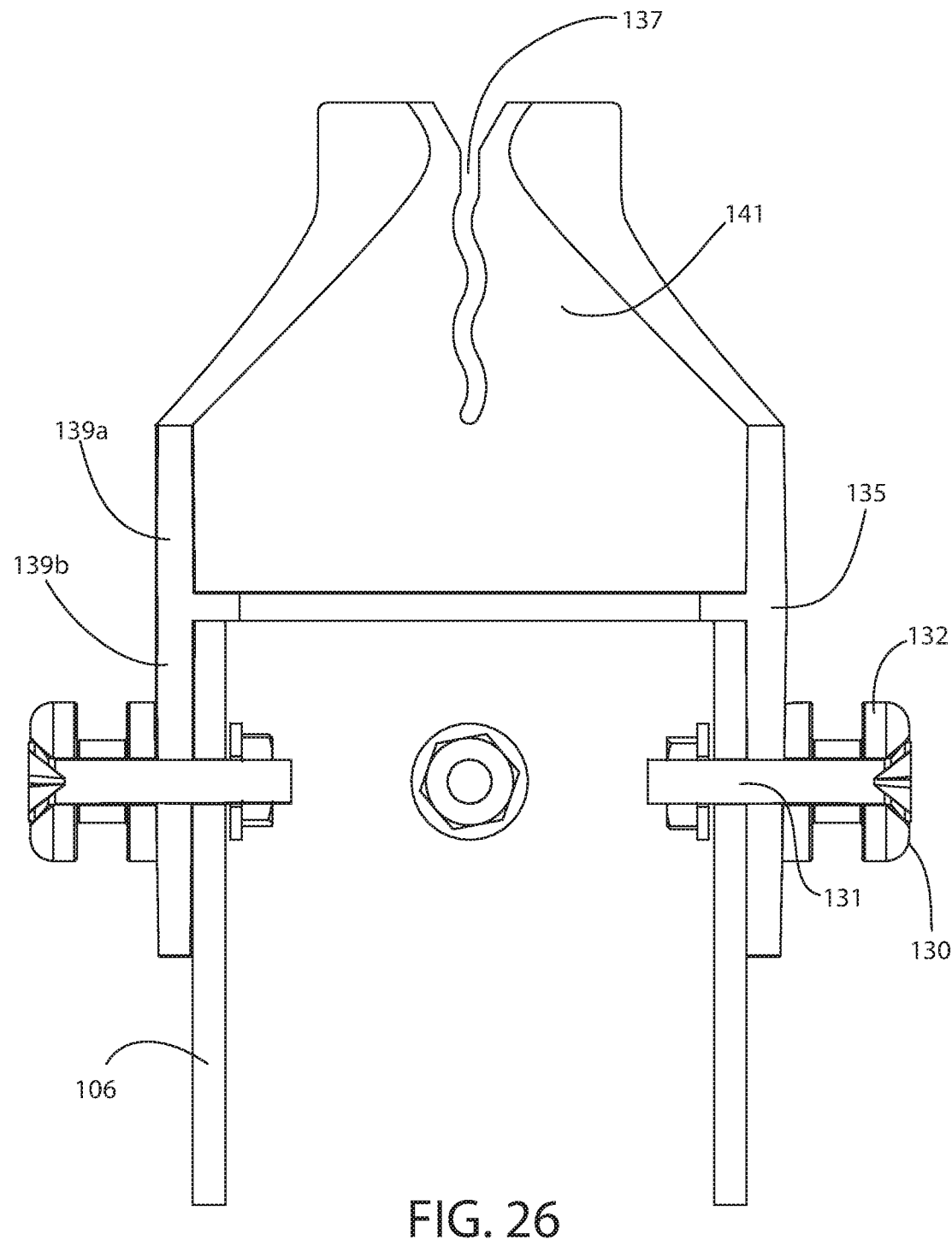
FIG. 26 is a section view, orthogonal to section A-A, of an end of a mast engaging a coupling sleeve for a modular barrier according to principles of the invention.
Figure 27:
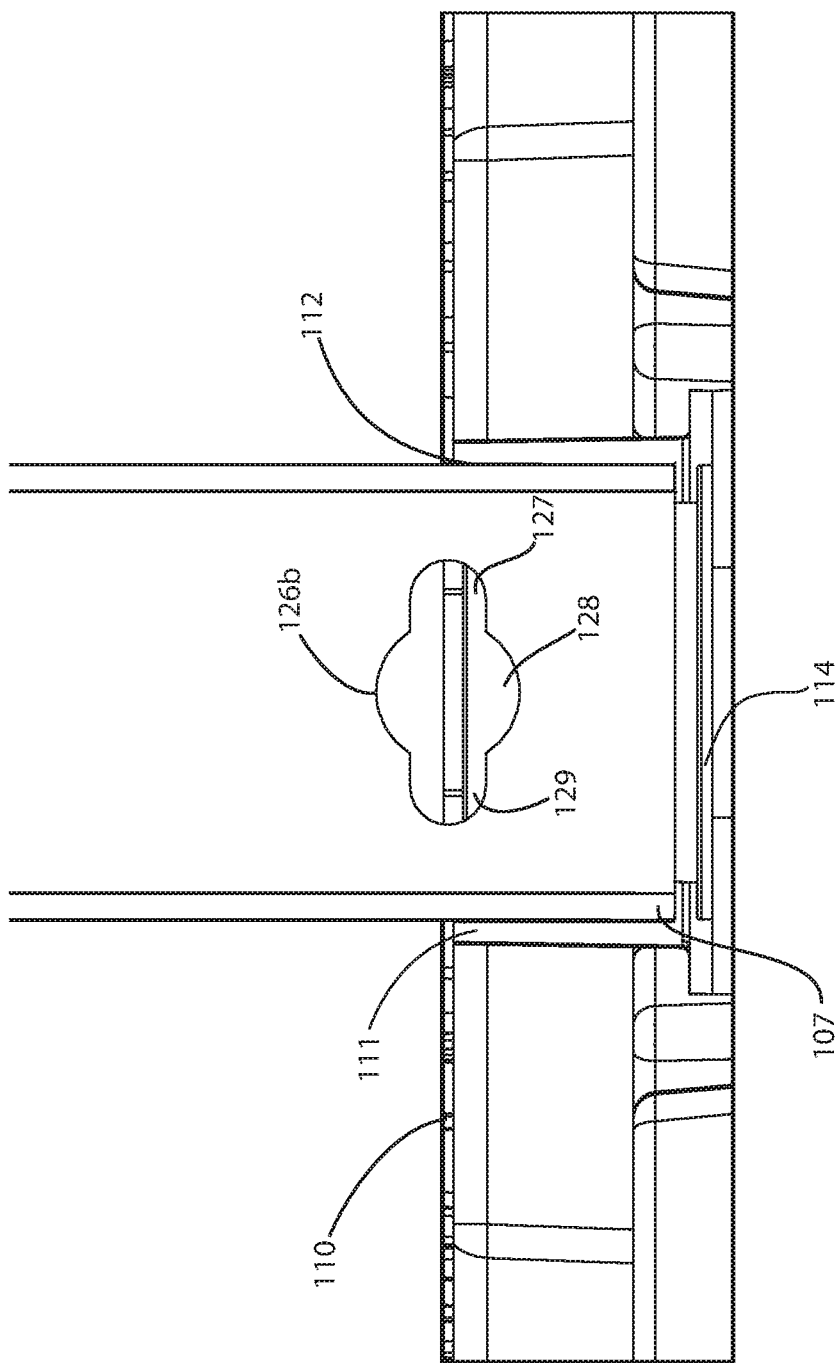
FIG. 27 is a section view of a base engaging an end of a mast for a modular barrier according to principles of the invention.

Referring now to FIGS. 25 through 27, each mast of the plurality of masts includes a hollow tube 105, a plurality of key slots 126a,b and a coupling bolt 130. The hollow tube 105 has a first end 106 and a second end 107 opposite the first end, a longitudinal axis extending from the first end to the second end, a length of at least two feet, a wall, a wall thickness (t), an outer surface of the wall, an inner surface of the wall, an outer diameter ($d_4$), an inner diameter ($d_5$), a first key slot 126a adjacent to the first end, and a second key slot 126b adjacent to the second end and in circumferential alignment with the first key slot.

Each key slot 126a, 126b is an aperture in the hollow tube 105. The aperture includes a first aperture portion 128 and a second aperture portion 127 extending from the first aperture portion 128. Optionally, there may be a third aperture portion 129 extending from the first aperture portion 128 opposite the second aperture portion. The first aperture portion 128 has a first aperture width, $w_1$. The second aperture portion 127 has a second aperture width, $w_2$. The second aperture width, $w_2$, is less than the first aperture width, The coupling bolt 130 is attachable to the hollow tube 105 between the first end 106 and the first key slot 126a. The coupling bolt 130 has a shank 131 with a shank width and shank length extending radially from the outer surface of the hollow tube 105 and terminating at a head 132. The head 132 has a head width (e.g., diameter) that exceeds the shank width (e.g., diameter) and exceeds the second aperture width, $W_2$, and is not greater than the first aperture width, $w_1$. The shank length is at least about the wall thickness, t. The first aperture portion 128 is sized and shaped to receive the head 132. The second aperture 127 portion (and optional third aperture portion 129) is sized and shaped to receive the shank 131 and prevent radial removal of the head 132 when the shank 131 is received in the second aperture portion 127.

In one implementation, the coupling bolt 130 of a first mast is received in the first key slot in a third mast with the shank of the coupling bolt of the first mast received in the second aperture portion of the first key slot in the third mast, as illustrated in FIG. 8. The coupling bolt of the second mast may be received in the second key slot of the third mast with the shank of the coupling bolt of the second mast is received in the second aperture portion of the second key slot in the third mast. The coupling bolt of the first mast is removable from the first key slot in the third mast and the coupling bolt of the second mast is removable from the second key slot of the third mast by rotating the third mast to align the head of the coupling bolt of the first mast with the first aperture portion of the first key slot in the third mast while aligning the head of the coupling bolt of the second mast with the first aperture portion of the second key slot in the third mast.

In one implementation, more than one coupling sleeve, e.g., first and second coupling sleeves, are provided. Each coupling sleeve 135 includes a hollow sleeve having a union end 139b, a free end 139a opposite the union end, and a longitudinal coupling axis extending from the union end to the free end. The union end 139b has an inner diameter that is about equal to the outer diameter of each mast.

A slot or aperture 136 is formed in the free end of the coupling sleeve 135. The longitudinal coupling axis is an axis of symmetry for the slot. The slot has a U or semicircular shape and includes an opening having an opening width, $d_1$, an intermediate portion having an intermediate width, $d_2$, and a vertex. The distance, $d_3$, from the vertex to the opening of the slot is greater (even if just slightly greater) than one half of the outer diameter, $d_4$, of each mast. The intermediate width, $d_2$, is about equal to the outer diameter, $d_4$, of each mast. The opening width, $d_1$, is deformable from a relaxed state to a spread state. In the relaxed state it is less than the outer diameter, $d_4$, of each mast. In the spread state it is at least as great as the outer diameter, $d_4$, of each mast. The slot 136 is oriented to receive a portion of a mast oriented orthogonal to longitudinal coupling axis.

In one configuration, the union end 139b of a first coupling sleeve mates with the first end of a first mast and the union end 139b of a second coupling sleeve mates with a first end of a second mast. The slot of the first coupling sleeve may receive the first end of a third mast, as illustrated in FIG. 9. The slot of the second coupling sleeve may receive the second end of the third mast.

Each coupling sleeve may further include a pair of spaced apart tabs 137a, 138a between the slot 136 formed in the free end 139a of the coupling sleeve 135. Each tab 137a, 138a including a narrow slit 137, 138 extending from the free end 139a to an intermediate point between the free end 139a and the union end 139b and generally parallel to the longitudinal coupling axis. The narrow slit is 137, 138 preferably an undulating slit, such as slit 140. Such a slit is useful for gripping tape, such as caution tape, or signs. The slit is less than ¼-inch, and preferably less than ⅛-inch, and more preferably no greater than 1/16-inch in width and resilient (i.e., able to be spread open and returning to undeformed position when relaxed).

In another configuration, the union end 139b of a first coupling sleeve mates with the first end 106 of the first mast and the union end 139b of a second coupling sleeve mates with the first end 107 of the second mast. In this configuration, a tape may extend from at least one of the undulating slits 137, 138 of the first coupling sleeve to at least one of the undulating slits 137, 138 of the second coupling sleeve. The undulating slits 137, 138 grip the tape.

In another configuration, the free end 139a of each coupling sleeve 135 is sized to receive a second end 107 of each mast in alignment with the longitudinal coupling axis, as conceptually shown in FIG. 10.

In another embodiment, additional masts, including a fourth mast and a fifth mast may be provided. In such an embodiment, the union end 139b of the first coupling sleeve may mate with the first end of the first mast, and the union end 139b of the second coupling sleeve may mate with the first end of the second mast, and the second end of the fourth mast may be received in the free end of the first coupling sleeve, with the fourth mast and the first mast being in axial alignment. The second end of the fifth mast may be received in the free end 139a of the second coupling sleeve, with the fifth mast and the second mast being in axial alignment and generally parallel to the fourth mast and the first mast.

In another embodiment, an additional mast, i.e., a fourth mast, and an additional coupling sleeve, i.e., a third coupling sleeve, are provided. In this embodiment, the union end 139b of the first coupling sleeve mates with the first end of the first mast, and the union end 139b of the second coupling sleeve mates with the first end of the second mast, and the union end 139b of the third coupling sleeve mates with the first end of the third mast. The second end of the fourth mast is received in the free end 139a of the third coupling sleeve. The fourth mast and the third mast may be in axial alignment. The slot of the first coupling sleeve receives the first end of the third mast. The slot of the second coupling sleeve receives the second end of the fourth mast.

With reference to FIG. 27, a base 110 may be provided to engage an end 107 of a vertically oriented mast in a vertical orientation. One embodiment may include a first base and a second base. Each base 110 may include a broad base having a base length that is at least three times the outer diameter of each mast, and a base width that is at least three times the outer diameter of each mast, and a base thickness that is at least as great as a distance from the second end of each mast to the second key slot of each mast (e.g., at least an inch thick). The base 110 includes a generally central mortise (i.e., socket) 112 that is shaped and sized to securely receive and frictionally engage the engaged end 107 of each mast. The central mortise 112 may include a collar 114 with a base sleeve 111 having a non-circular outer circumference shape. The base sleeve 111 may be received securely in a central aperture (mortise 112) in the base. The engaged end of the first mast may be received in the central mortise (e.g., in base sleeve of the central mortise) of the first base. The engaged end of the second mast may be received in the central mortise (e.g., in base sleeve of the central mortise) of the second base.

Masts may be equipped with reflectors, such as retro-reflective sleeves 115, as conceptually illustrated in FIGS. 1-4. Each retro-reflective sleeve 115 includes a plurality of adjoining panels (e.g., 3) defining an interior channel bound by a plurality of exterior planar surfaces (e.g., 3). Each exterior planar surface includes a retro-reflective element. The interior channel is sized to receive each mast. Each mast includes a midpoint between the first end and the second end of the mast. The first retro-reflective sleeve receives a portion of the first mast, between the first end and the midpoint of the first mast, and is secured to the received portion of the first mast with an attachment 120 (e.g., one or more mechanical attachments such as a rivet, nut and bolt, screw, snap-fit coupling or the like).

In another embodiment, a top mast with a rounded free 315 end 139a is provided for supporting a tarp or other cover without puncturing it, as illustrated in FIG. 20. An exemplary top mast includes a mast with a hemispherical cap 315 attached to the first end. The second end of the top mast is received in the free end 139a of the first coupling sleeve 135.

Referring now to FIGS. 28 through 38, dimensioned components are illustrated. The dimensions are provided as nonlimiting examples. The dimensions are in inches.

Figure 28:
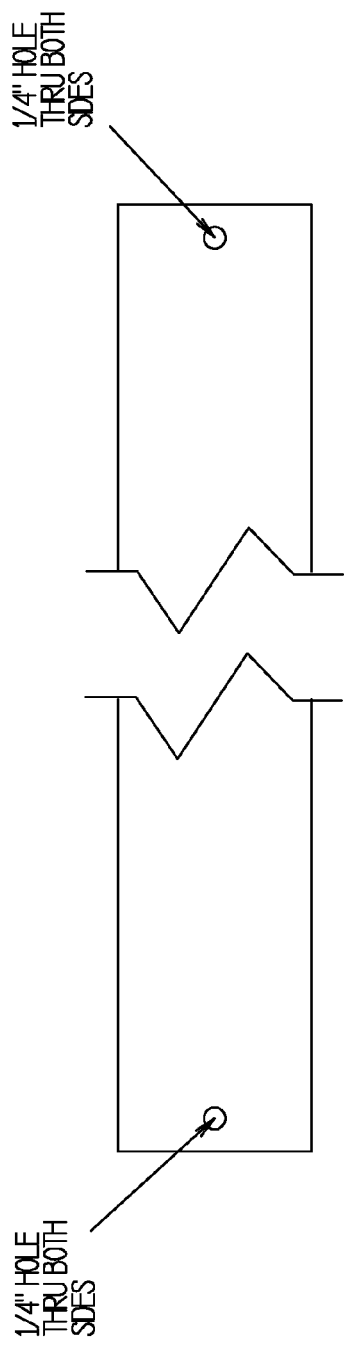
FIG. 28 conceptually illustrates a dimensioned mast for a modular barrier according to principles of the invention.
Figure 29:
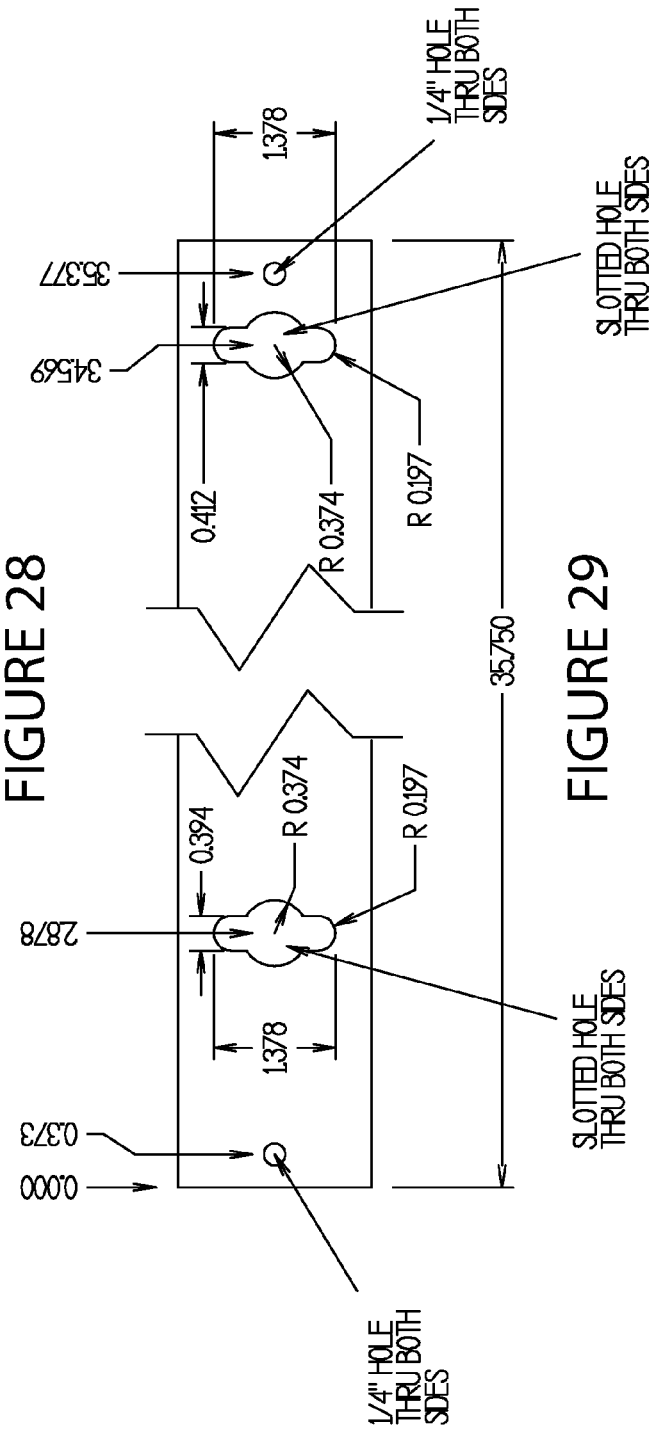
FIG. 29 conceptually illustrates another dimensioned mast for a modular barrier according to principles of the invention.

FIG. 28 conceptually illustrates a dimensioned mast 105 for a modular barrier according to principles of the invention. In this embodiment, the mast 105 does not include key slots 125. FIG. 29 conceptually illustrates another dimensioned mast 105 for a modular barrier according to principles of the invention. In this embodiment, the mast includes key slots 125.

FIGS. 30-32 provide plan and side views of an exemplary coupling sleeve 135. In this embodiment the sleeve 135 includes semicircular slots 136 formed in each end of the sleeve 135. The slots 136 are oriented orthogonal to each other. Undulating slits 138 are formed in one end. This coupling sleeve 135 may be used with or without a mast. By way of example, each slot may be used to couple a mast. Thus, the sleeve may join two masts together, orthogonally.

Figure 34:
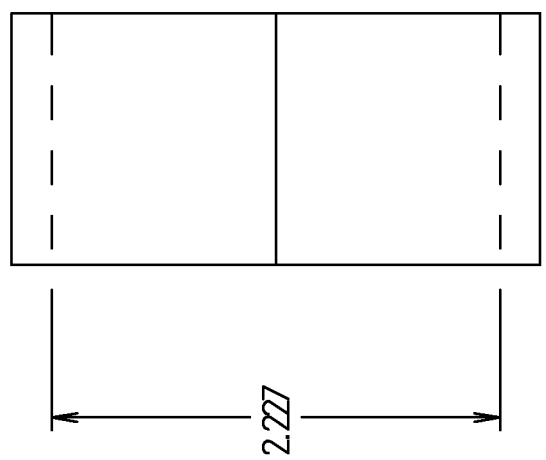
FIG. 34 provides a dimensioned side view of a hexagonal base support with a cylindrical opening in which the end of a mast is received for a modular barrier according to principles of the invention.
Figure 33:
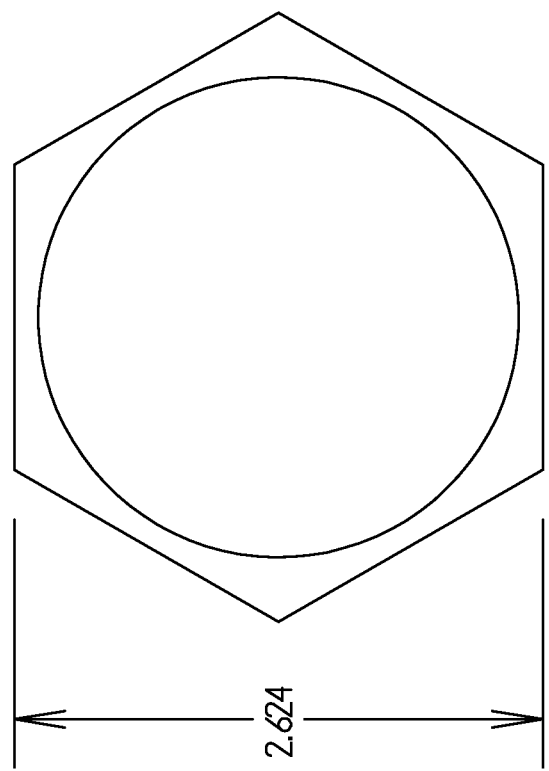
FIG. 33 provides a dimensioned plan view of a hexagonal base support with a cylindrical opening in which the end of a mast is received for a modular barrier according to principles of the invention.

FIGS. 33 and 34 provide plan and side views of a hexagonal collar 116 with a cylindrical opening in which the end of a mast is received. The hexagonal collar 116 plugs into a corresponding slot in the base 110, which may be a solid base.

Figure 35:
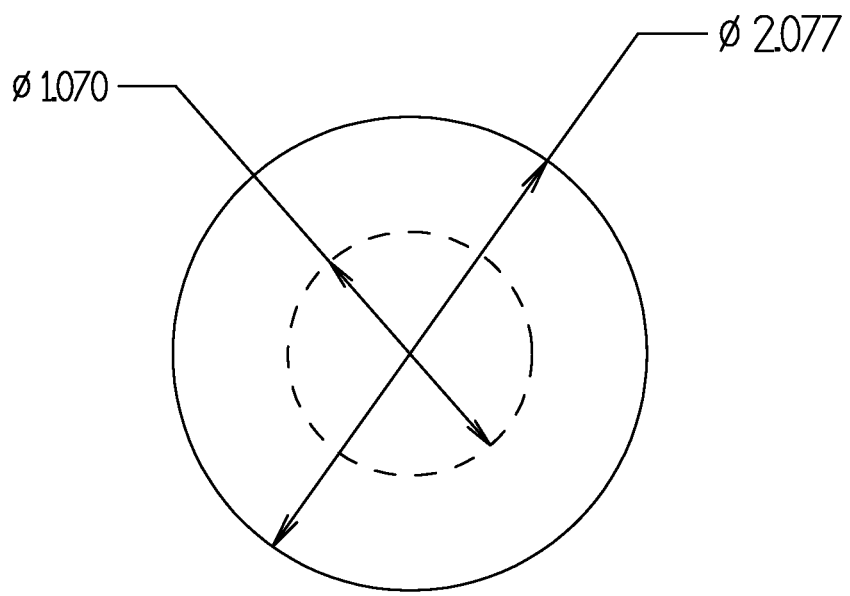
FIG. 35 provides a dimensioned front view of an exemplary coupling bolt for a modular barrier according to principles of the invention.
Figure 36:
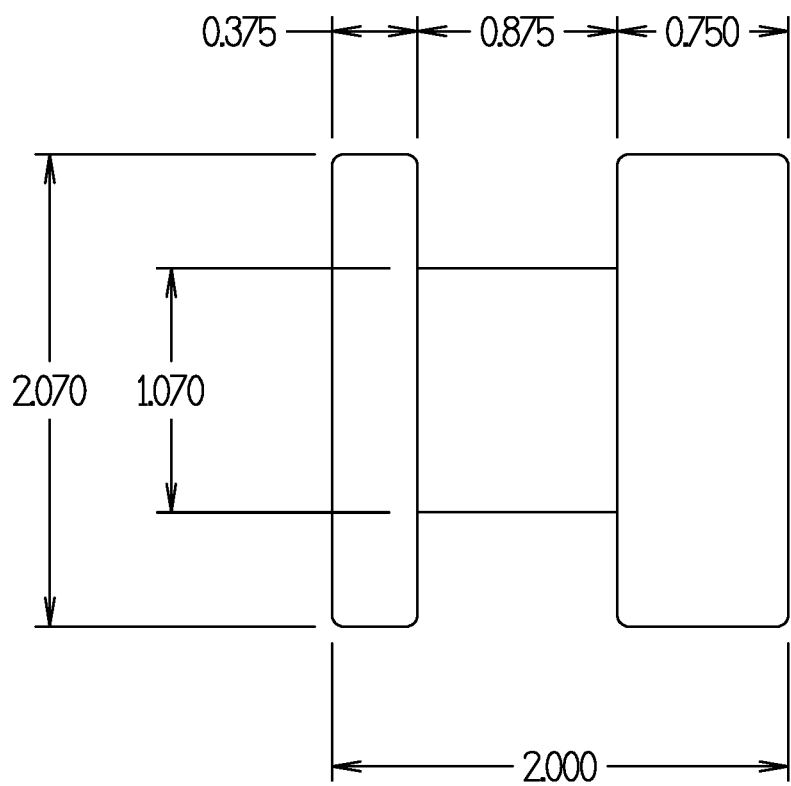
FIG. 36 provides a dimensioned side view of an exemplary coupling bolt for a modular barrier according to principles of the invention.

FIGS. 35 and 36 provides front and side views of an exemplary coupling bolt 130 for a modular barrier according to principles of the invention. The space (0.875 inches) is about equal to the thickness of a wall of an exemplary mast 105. Thus, an engaged edge of a key slot 125 snaps into the space (0.875 inches) and is securely held.

Figure 38:
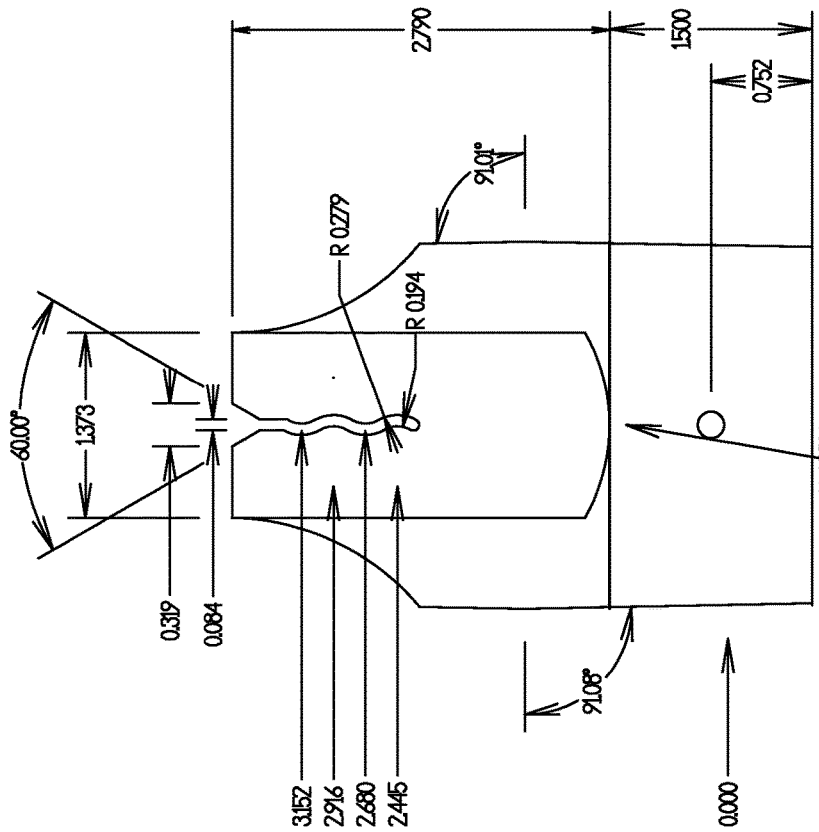
FIG. 38 provides a dimensioned second side view of an exemplary coupling sleeve with one slots formed in a free end for a modular barrier according to principles of the invention.
Figure 37:
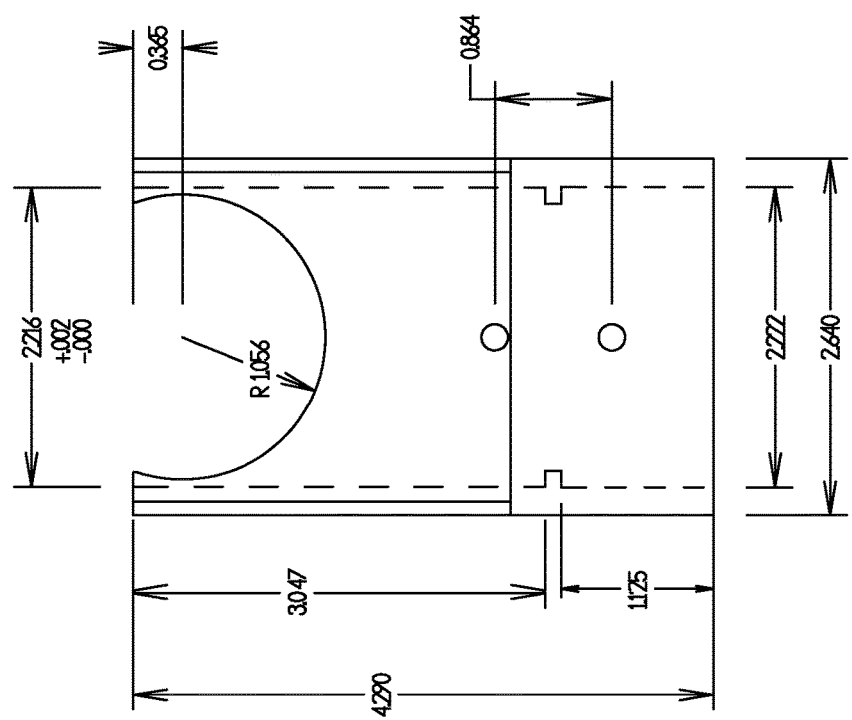
FIG. 37 provides a dimensioned first side view of an exemplary coupling sleeve with one slot formed in a free end for a modular barrier according to principles of the invention.

FIGS. 37 and 38 provide dimensioned side views of an exemplary coupling sleeve 135 with one slot 136 formed in a free end. Unlike the embodiment of FIGS. 30-32, this embodiment includes one slot 136.

Figure 39:
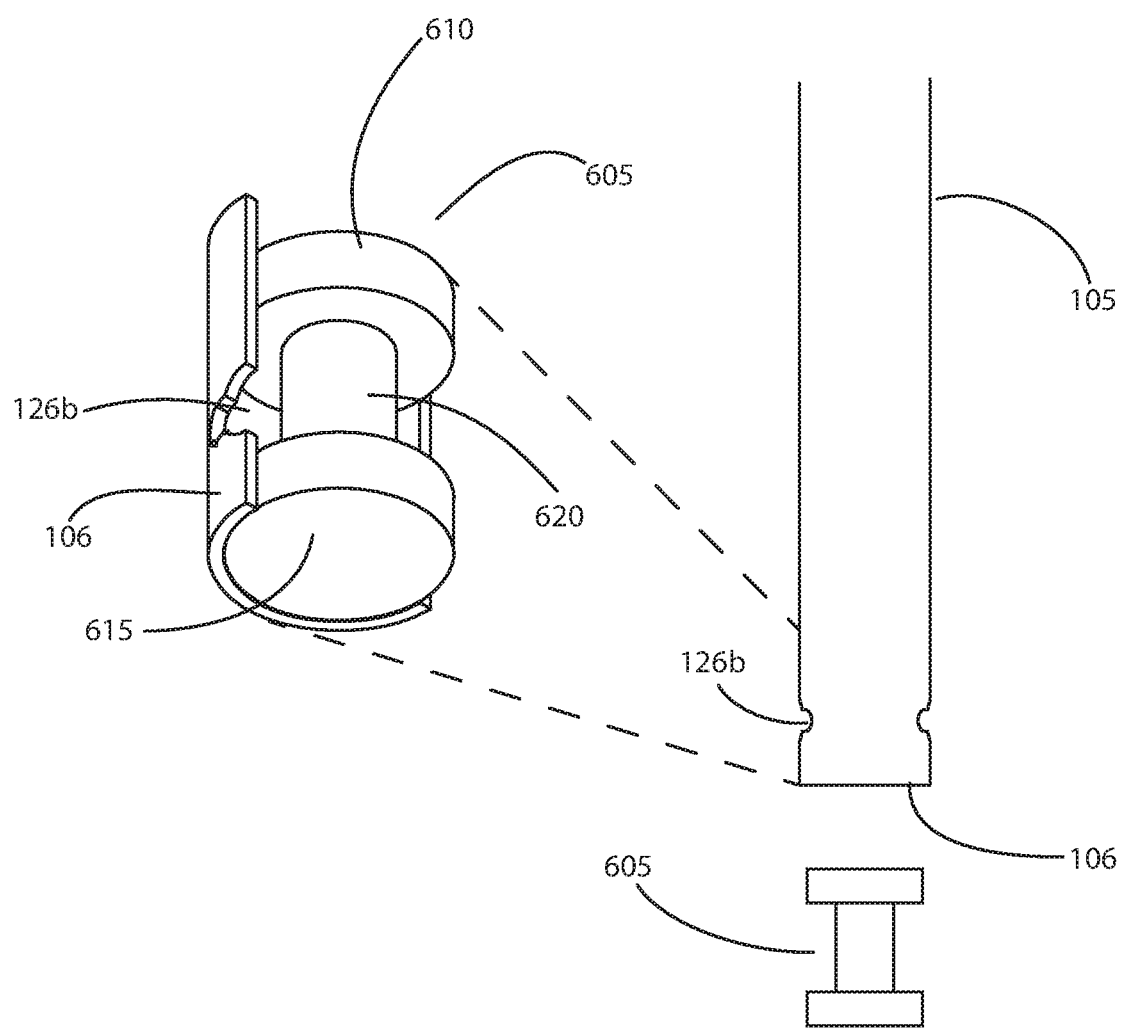
FIG. 39 provides a side and magnified section perspective view of a stiffener for a modular barrier according to principles of the invention.

With reference to FIG. 39, a stiffener 605 may be inserted in an end 106 of hollow tube 105. The stiffener 605 enhances rigidity of the hollow tube 105 in the areas of key slots 126a, b, where removed material to form key slots compromises rigidity. A nonlimiting example of a stiffener is a dumbbell shaped insert 605 having concentric top and bottom ends 610, 615 connected by a concentric shaft 620. The top and bottom ends 610, 615 have an outer diameter that is about equal to the inner diameter of the tube 105. The shaft 620 has a smaller diameter to allow connections to be made through key slots 126a, b. The length of the shaft 620 is greater than the height of the first aperture portion 128 of the key slots 126a, b. The stiffener may be hollow or solid and comprised of any suitable material including substantially rigid plastics, wood or metal. Shapes other than a dumbbell may be utilized without departing from the scope of the invention.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A modular barrier comprising a plurality of masts, including a first mast, a second mast and a third mast, the first mast being spaced apart from and generally parallel to the second mast, the third mast being generally parallel to and releasably attached to the first and second masts,
    each mast of the plurality of masts comprising a hollow tube, a plurality of key slots and a coupling bolt,
        the hollow tube having a first end and a second end opposite the first end, a longitudinal axis extending from the first end to the second end, a length of at least two feet, a wall, a wall thickness, an outer surface, an inner surface, an outer diameter, an inner diameter, a first key slot adjacent to the first end, a second key slot adjacent to the second end and in circumferential alignment with the first key slot,
        each key slot comprising an aperture in the hollow tube, the aperture including a first aperture portion and a second aperture portion extending from the first aperture portion, the first aperture portion having a first aperture width, the second aperture portion having a second aperture width, the second aperture width being less than the first aperture width,
        the coupling bolt being attached to the hollow tube between the first end and the first key slot and comprising a shank having a shank width and shank length and extending radially from the outer surface of the hollow tube and terminating at a head, the head having a head width that exceeds the shank width and exceeds the second aperture width and is not greater than the first aperture width, and the shank length being at least about the wall thickness, and the first aperture portion being sized and shaped to receive the head, and the second aperture portion being sized and shaped to receive the shank and prevent radial removal of the head when the shank is received in the second aperture portion.

2. The modular barrier of claim 1,
    the coupling bolt of the first mast being received in the first key slot in the third mast with the shank of the coupling bolt of the first mast being received in the second aperture portion of the first key slot in the third mast, and the coupling bolt of the second mast being received in the second key slot of the third mast with the shank of the coupling bolt of the second mast being received in the second aperture portion of the second key slot in the third mast, and
    the coupling bolt of the first mast being removable from the first key slot in the third mast, and the coupling bolt of the second mast being removable from the second key slot of the third mast by rotating the third mast to align the head of the coupling bolt of the first mast with the first aperture portion of the first key slot in the third mast while aligning the head of the coupling bolt of the second mast with the first aperture portion of the second key slot in the third mast.

3. The modular barrier of claim 1, further comprising a plurality of coupling sleeves, including a first coupling sleeve and a second coupling sleeve,
    each coupling sleeve comprising a hollow sleeve having a union end, a free end opposite the union end, and a longitudinal coupling axis extending from the union end to the free end, the union end having an inner diameter being about equal to the outer diameter of each mast, and
    a slot formed in the free end of the coupling sleeve, the longitudinal coupling axis being an axis of symmetry for the slot, the slot having a semicircular shape and including an opening having an opening width, an intermediate portion having an intermediate width, and a vertex, a distance from the vertex to the opening of the slot being greater than one half of the outer diameter of each mast, the intermediate width being about equal to the outer diameter of each mast, and the opening width being deformable from a relaxed state to a spread state, and in the relaxed state being less than the outer diameter of each mast, and in the spread state being at least as great as the outer diameter of each mast, and the slot being oriented to receive a portion of a mast oriented orthogonal to longitudinal coupling axis.

4. The modular barrier of claim 3, the union end of the first coupling sleeve mating with the first end of the first mast, and the union end of the second coupling sleeve mating with the first end of the second mast, and the slot of the first coupling sleeve receiving the first end of the third mast, and the slot of the second coupling sleeve receiving the second end of the third mast.

5. The modular barrier of claim 3, each coupling sleeve further comprising a pair of spaced apart tabs between the slot formed in the free end of the coupling sleeve, each tab including a narrow slit extending from the free end to an intermediate point between the free end and the union end and generally parallel to the longitudinal coupling axis.

6. The modular barrier of claim 5, each narrow slit comprising an undulating slit.

7. The modular barrier of claim 6, the union end of the first coupling sleeve mating with the first end of the first mast, and the union end of the second coupling sleeve mating with the first end of the second mast, and further comprising a tape extending from at least one of the undulating slits of the first coupling sleeve to at least one of the undulating slits of the second coupling sleeve, and the undulating slits gripping the tape.

8. The modular barrier of claim 6, the union end of the first coupling sleeve mating with the first end of the first mast, and the union end of the second coupling sleeve mating with the first end of the second mast, and the slot of the first coupling sleeve receiving the first end of the third mast, and the slot of the second coupling sleeve receiving the second end of the third mast.

9. The modular barrier of claim 3, the free end of each coupling sleeve being sized to receive a second end of each mast in alignment with the longitudinal coupling axis.

10. The modular barrier of claim 9, further comprising a fourth mast and a fifth mast, and the union end of the first coupling sleeve mating with the first end of the first mast, and the union end of the second coupling sleeve mating with the first end of the second mast, and the second end of the fourth mast being received in the free end of the first coupling sleeve and the fourth mast and the first mast being in axial alignment, and the second end of the fifth mast being received in the free end of the second coupling sleeve and the fifth mast and the second mast being in axial alignment and generally parallel to the fourth mast and the first mast.

11. The modular barrier of claim 9, further comprising a fourth mast and a third coupling sleeve, and the union end of the first coupling sleeve mating with the first end of the first mast, and the union end of the second coupling sleeve mating with the first end of the second mast, and the union end of the third coupling sleeve mating with the first end of the third mast, and the second end of the fourth mast being received in the free end of the third coupling sleeve and the fourth mast and the third mast being in axial alignment, and the slot of the first coupling sleeve receiving the first end of the third mast, and the slot of the second coupling sleeve receiving the second end of the fourth mast.

12. The modular barrier of claim 9, further comprising a top mast, the top mast comprising a mast with a hemispherical cap attached to the first end, the second end of the top mast being received in the free end of the first coupling sleeve.

13. The modular barrier of claim 1, further comprising a plurality of bases, including a first base and a second base,
    each base comprising a broad base having a base length that is at least three times the outer diameter of each mast, and a base width that is at least three times the outer diameter of each mast, and a base thickness that is at least as great as a distance from the second end of each mast to the second key slot of each mast, the base including a generally central mortise shaped and sized to securely receive and frictionally engage the second end of each mast.

14. The modular barrier of claim 13, the distance from the second end of each mast to the second key slot of each mast being at least one inch.

15. The modular barrier of claim 14, the second end of the first mast being received in the central mortise of the first base, and the second end of the second mast being received in the central mortise of the second base.

16. The modular barrier of claim 15, the central mortise comprising a base sleeve having a noncircular outer circumference shape, the base sleeve being received securely in a central aperture in the base.

17. The modular barrier of claim 16, the second end of the first mast being received in the base sleeve of the central mortise of the first base, and the second end of the second mast being received in the base sleeve of the central mortise of the second base.

18. The modular barrier of claim 1, further comprising a plurality of retroreflective sleeves, including a first retroreflective sleeve and a second retroreflective sleeve,
    each retroreflective sleeve comprising a plurality of adjoining panels defining an interior channel bound by a plurality of exterior planar surfaces, each exterior planar surface including a retrofelective element, the interior channel being sized to receive each mast.

19. The modular barrier of claim 18, the plurality of adjoining panels comprising three adjoining panels.

20. The modular barrier of claim 18, each mast including a midpoint between the first end and the second end, and the first retroreflective sleeve receiving a portion of the first mast between the first end and the midpoint of the first mast, and being secured to the received portion of the first mast with an attachment.

* * * * *